United States Patent
Nam et al.

(10) Patent No.: US 10,779,328 B2
(45) Date of Patent: Sep. 15, 2020

(54) REFERENCE SIGNAL AND PREEMPTED RESOURCES COLLISION HANDLING

(71) Applicant: QUALCOMM Incorporated, San Diego, CA (US)

(72) Inventors: Wooseok Nam, San Diego, CA (US); Tao Luo, San Diego, CA (US); Jing Sun, San Diego, CA (US); Jing Jiang, San Diego, CA (US); Heechoon Lee, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 16/162,227

(22) Filed: Oct. 16, 2018

(65) Prior Publication Data

US 2019/0166625 A1 May 30, 2019

Related U.S. Application Data

(60) Provisional application No. 62/591,129, filed on Nov. 27, 2017.

(51) Int. Cl.
*H04W 74/08* (2009.01)
*H04L 5/00* (2006.01)
(Continued)

(52) U.S. Cl.
CPC ...... *H04W 74/0816* (2013.01); *H04B 7/0626* (2013.01); *H04L 1/0058* (2013.01);
(Continued)

(58) Field of Classification Search
CPC ......... H04W 74/0816; H04W 72/0446; H04W 72/10; H04B 7/0626; H04L 1/0058;
(Continued)

(56) References Cited

U.S. PATENT DOCUMENTS

| 6,058,307 A * | 5/2000 | Garner ............... H04B 7/18539 455/428 |
| 2012/0082034 A1 * | 4/2012 | Vasseur .................. H04L 45/04 370/235 |

(Continued)

OTHER PUBLICATIONS

CATT: "Remaining Aspects of Pre-Emption Indication", 3GPP Draft; R1-1720207, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017 Nov. 18, 2017, XP051369843, Retrieved from the Internet: URL:http://www.3gpp.org/ftp/tsg%5Fran/WG1%5FRL1/TSGR1 %5F91/Docs/ [retrieved on Nov. 18, 2017], 7 pages.

(Continued)

*Primary Examiner* — Duc C Ho
(74) *Attorney, Agent, or Firm* — Holland & Hart, LLP

(57) ABSTRACT

Methods, systems, and devices for wireless communications are described. A user equipment (UE) may identify a reference signal preemption scheme associated with one or more reference signal resources being preempted for priority transmissions during a time period. The UE may determine that resources of one or more reference signals have been preempted during the time period and in accordance with the reference signal preemption scheme. The UE may implement a reference signal preemption response scheme that is selected based at least in part on the resources of the one or more reference signals being preempted.

52 Claims, 15 Drawing Sheets

(51) Int. Cl.
  *H04B 7/06* (2006.01)
  *H04L 1/00* (2006.01)
  *H04W 72/04* (2009.01)
  *H04W 72/10* (2009.01)
  *H04L 1/18* (2006.01)

(52) U.S. Cl.
  CPC .......... *H04L 5/0048* (2013.01); *H04L 5/0096* (2013.01); *H04W 72/0446* (2013.01); *H04W 72/10* (2013.01); *H04L 1/1812* (2013.01); *H04L 5/0007* (2013.01)

(58) Field of Classification Search
  CPC ... H04L 5/0048; H04L 5/0096; H04L 1/1812; H04L 5/0007
  See application file for complete search history.

(56) References Cited

U.S. PATENT DOCUMENTS

2017/0353866 A1* 12/2017 Gou ................. H04L 5/0005
2017/0357531 A1* 12/2017 Zhang ................. G06F 9/5005

OTHER PUBLICATIONS

International Search Report and Written Opinion—PCT/US2018/056386—ISA/EPO—dated Jan. 21, 2019.
Spreadtrum Communications: "Consideration on DL RS Multiplexing", 3GPP Draft; R1-1717744_Consideration on DL RS Multiplexing_Final, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017 Oct. 8, 2017, XP051340929, Retrieved from the Internet: URL:http://www.3gpp.org/ftp/Meetings_3GPP_SYNC/RAN1/Docs/ [retrieved on Oct. 8, 2017], 8 pages.
VIVO: "Multiplexing data with different transmission durations", 3GPP Draft; R1-1717502_Multiplexing data with different transmission durations, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017 Oct. 8, 2017, XP051340690, Retrieved from the Internet: URL:http://www.3gpp.org/ftp/Meetings_3GPP_SYNC/RAN1/Docs/ [retrieved on Oct. 8, 2017], 10 Pages.

* cited by examiner

US 10,779,328 B2

REFERENCE SIGNAL AND PREEMPTED RESOURCES COLLISION HANDLING

CROSS REFERENCES

The present Application for patent claims the benefit of U.S. Provisional Patent Application No. 62/591,129 by NAM, et al., entitled "REFERENCE SIGNAL AND PREEMPTED RESOURCES COLLISION HANDLING," filed Nov. 27, 2017, assigned to the assignee hereof, and expressly incorporated herein.

BACKGROUND

The following relates generally to wireless communication, and more specifically to reference signal (RS) and preempted resources collision handling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Certain wireless communication systems may perform wireless communications using various data types and/or priorities. As one example of a high priority communication, certain priority transmissions may include communication of the data packets that occur within a tight timeline and at a high reliability factor. One non-limiting example of such priority communications may include ultra-reliable, low latency communications (URLLC). As one example of a lower priority (at least with respect to certain data types) communication, certain transmissions may include communication of the data packets that occur using a wider timeline and have a wider margin of error tolerance. One non-limiting example of such lower priority communications may include machine-type communications (MTC), mobile broadband (MBB) communications, enhanced MBB (eMBB) communications, and the like.

Certain wireless communication systems may be configured to support dynamic resource sharing between priority transmissions (e.g., URLLC) and other transmission types (e.g., eMBB). For example, when data packet(s) for a priority transmission arrive at the transmitting device, resources for the low priority services may be punctured with the priority transmission data packets, i.e., priority data packets may preempt the lower priority data packets. The receiving device (e.g., UE) may monitor for a preemption indicator to determine how to respond to the preemption, e.g., how to process the data. For example, the receiving device may receive and buffer information during a slot (e.g., a first time period) that includes certain low priority data packets being preempted by higher priority data packets. The receiving device may receive the preemption indication in the next slot (e.g., second time period) and then decode or otherwise process the first slot according to the preemption indication. However, in some circumstances the preempted resources may puncture resources allocated to reference signals as well as the data packet resources. The loss of the reference signals in general, and certain types of reference signals more particularly, may negatively impact system performance.

SUMMARY

The described techniques relate to improved methods, systems, devices, or apparatuses that support reference signal (RS) and preempted resources collision handling. Generally, the described techniques provide for implementation of a RS preemption response scheme to address the situation where some or all of the resources of the RSs are preempted during a time period (e.g., a slot). In some aspects, the user equipment (UE) may be configured (e.g., preconfigured and/or may be signaled from the base station) with a RS preemption scheme for RS(s) being preempted during the time period. For example, the UE may receive a preemption indication in the next slot indicating that resources used for RS(s) in the previous slot were preempted by a priority transmission. The UE may then determine that the RS(s) were preempted during the slot, e.g., may identify the location of the RS(s) that have been preempted during the slot based on the information indicated in the preemption indication. The UE and the base station may then implement a RS preemption response scheme that may vary depending upon which RS(s) were preempted during the slot. The RS preemption response scheme may be based on how many of the RS resource(s) were preempted, on which type of RS resource(s) were preempted, and the like. Accordingly, the UE and base station may utilize the RS preemption response scheme to determine various response strategies such as channel performance measurement and reporting, appropriate decoding and demodulation protocols, time/frequency tracking and updating, phase tracking and updating, and the like.

A method of wireless communication is described. The method may include identifying a reference signal preemption scheme associated with one or more reference signal resources being preempted for priority transmissions during a time period, determining that resources of one or more reference signals have been preempted during the time period and in accordance with the reference signal preemption scheme, and implementing a reference signal preemption response scheme that is selected based at least in part on the resources of the one or more reference signals being preempted.

An apparatus for wireless communication is described. The apparatus may include means for identifying a reference signal preemption scheme associated with one or more reference signal resources being preempted for priority transmissions during a time period, means for determining that resources of one or more reference signals have been preempted during the time period and in accordance with the reference signal preemption scheme, and means for implementing a reference signal preemption response scheme that is selected based at least in part on the resources of the one or more reference signals being preempted.

Another apparatus for wireless communication is described. The apparatus may include a processor, memory in electronic communication with the processor, and instructions stored in the memory. The instructions may be operable to cause the processor to identify a reference signal preemption scheme associated with one or more reference signal resources being preempted for priority transmissions during a time period, determine that resources of one or more reference signals have been preempted during the time period and in accordance with the reference signal preemption scheme, and implement a reference signal preemption response scheme that is selected based at least in part on the resources of the one or more reference signals being preempted.

A non-transitory computer-readable medium for wireless communication is described. The non-transitory computer-readable medium may include instructions operable to cause a processor to identify a reference signal preemption scheme associated with one or more reference signal resources being preempted for priority transmissions during a time period, determine that resources of one or more reference signals have been preempted during the time period and in accordance with the reference signal preemption scheme, and implement a reference signal preemption response scheme that is selected based at least in part on the resources of the one or more reference signals being preempted.

Some examples of the method, apparatus, and non-transitory computer-readable medium described above may further include processes, features, means, or instructions for determining that resources for greater than a defined number of CSI-RSs may have been preempted during the time period, wherein the selected reference signal preemption response scheme comprises avoiding performing channel measurement and reporting during the time period.

Some examples of the method, apparatus, and non-transitory computer-readable medium described above may further include processes, features, means, or instructions for determining that resources for greater than a defined number of CSI-RSs may have been preempted for a first portion of a bandwidth part during the time period, wherein the selected reference signal preemption response scheme comprises performing channel measurement and reporting during the time period on a second portion of the bandwidth part that may be different from the first portion.

Some examples of the method, apparatus, and non-transitory computer-readable medium described above may further include processes, features, means, or instructions for determining that resources for CSI-RSs may have not been preempted during the time period. Some examples of the method, apparatus, and non-transitory computer-readable medium described above may further include processes, features, means, or instructions for performing rate matching to decode and demodulate the priority transmissions that may be transmitted using resources proximate to the resources of the CSI-RSs.

Some examples of the method, apparatus, and non-transitory computer-readable medium described above may further include processes, features, means, or instructions for receiving a configuration message identifying the resources of the CSI-RSs that may have proximate resources used for the priority transmissions.

Some examples of the method, apparatus, and non-transitory computer-readable medium described above may further include processes, features, means, or instructions for determining that resources for greater than a defined number of DMRSs may have been preempted during the time period, wherein the selected reference signal preemption response scheme comprises refraining from performing decoding and demodulation of the transmissions occurring during the time period.

Some examples of the method, apparatus, and non-transitory computer-readable medium described above may further include processes, features, means, or instructions for refraining from transmitting hybrid automatic repeat/request (HARQ) feedback information for the time period.

Some examples of the method, apparatus, and non-transitory computer-readable medium described above may further include processes, features, means, or instructions for determining that resources for less than a defined number of DMRSs may have been preempted during the time period, wherein the selected reference signal preemption response scheme comprises performing channel decoding and demodulation during the time period for DMRSs that may be not preempted during the time period.

Some examples of the method, apparatus, and non-transitory computer-readable medium described above may further include processes, features, means, or instructions for identifying one or more code block groups (CBGs) that may be proximate to the resources of the DMRSs that may be not preempted during the time period. Some examples of the method, apparatus, and non-transitory computer-readable medium described above may further include processes, features, means, or instructions for decoding the one or more CBGs.

Some examples of the method, apparatus, and non-transitory computer-readable medium described above may further include processes, features, means, or instructions for receiving a configuration message identifying the one or more CBGs.

Some examples of the method, apparatus, and non-transitory computer-readable medium described above may further include processes, features, means, or instructions for determining that resources for unicast DMRSs may have been preempted during the time period, wherein the selected reference signal preemption response scheme comprises refraining from decoding and demodulating the transmissions occurring during the time period.

Some examples of the method, apparatus, and non-transitory computer-readable medium described above may further include processes, features, means, or instructions for determining that resources for tracking reference signals (TRSs) may have been preempted during the time period, wherein the selected reference signal preemption response scheme comprises refraining from performing timing and frequency updating procedures for the channel during the time period.

Some examples of the method, apparatus, and non-transitory computer-readable medium described above may further include processes, features, means, or instructions for determining that resources for a defined number of TRSs may have been preempted during the time period, wherein the selected reference signal preemption response scheme comprises performing timing and frequency updating procedures during the time period using TRSs that may be not preempted during the time period.

Some examples of the method, apparatus, and non-transitory computer-readable medium described above may further include processes, features, means, or instructions for determining that resources for phase tracking reference signals (PTRSs) may have been preempted during the time period, wherein the selected reference signal preemption response scheme comprises refraining from performing phase tracking updating procedures during the time period.

Some examples of the method, apparatus, and non-transitory computer-readable medium described above may further include processes, features, means, or instructions for determining that resources for a defined number of PTRSs may have been preempted during the time period, wherein the selected reference signal preemption response scheme comprises performing phase tracking updating procedures during the time period using PTRSs that may be not preempted during the time period.

In some examples of the method, apparatus, and non-transitory computer-readable medium described above, identify the reference signal preemption scheme comprises: receiving a configuration message from a base station indicating the reference signal preemption scheme.

In some examples of the method, apparatus, and non-transitory computer-readable medium described above, the UE may be preconfigured with the reference signal preemption scheme.

A method of wireless communication is described. The method may include transmitting a configuration message indicating a reference signal preemption scheme associated with one or more reference signal resources being preempted for priority transmissions during a time period, preempting resources of one or more reference signals during the time period and in accordance with the reference signal preemption scheme, and implementing a reference signal preemption response scheme that is selected based at least in part on the resources of the one or more reference signals being preempted.

An apparatus for wireless communication is described. The apparatus may include means for transmitting a configuration message indicating a reference signal preemption scheme associated with one or more reference signal resources being preempted for priority transmissions during a time period, means for preempting resources of one or more reference signals during the time period and in accordance with the reference signal preemption scheme, and means for implementing a reference signal preemption response scheme that is selected based at least in part on the resources of the one or more reference signals being preempted.

Another apparatus for wireless communication is described. The apparatus may include a processor, memory in electronic communication with the processor, and instructions stored in the memory. The instructions may be operable to cause the processor to transmit a configuration message indicating a reference signal preemption scheme associated with one or more reference signal resources being preempted for priority transmissions during a time period, preempt resources of one or more reference signals during the time period and in accordance with the reference signal preemption scheme, and implement a reference signal preemption response scheme that is selected based at least in part on the resources of the one or more reference signals being preempted.

A non-transitory computer-readable medium for wireless communication is described. The non-transitory computer-readable medium may include instructions operable to cause a processor to transmit a configuration message indicating a reference signal preemption scheme associated with one or more reference signal resources being preempted for priority transmissions during a time period, preempt resources of one or more reference signals during the time period and in accordance with the reference signal preemption scheme, and implement a reference signal preemption response scheme that is selected based at least in part on the resources of the one or more reference signals being preempted.

Some examples of the method, apparatus, and non-transitory computer-readable medium described above may further include processes, features, means, or instructions for preempting resources for greater than a defined number of CSI-RSs during the time period. In some examples of the method, apparatus, and non-transitory computer-readable medium described above, the selected reference signal preemption response scheme comprises refraining from receiving channel measurement and reporting during the time period.

Some examples of the method, apparatus, and non-transitory computer-readable medium described above may further include processes, features, means, or instructions for preempting resources for greater than a defined number of CSI-RSs for a first portion of a bandwidth part during the time period, wherein the selected reference signal preemption response scheme comprises receiving channel measurement and reporting during the time period on a second portion of the bandwidth part that may be different from the first portion.

Some examples of the method, apparatus, and non-transitory computer-readable medium described above may further include processes, features, means, or instructions for refraining from preempting resources for CSI-RSs during the time period. Some examples of the method, apparatus, and non-transitory computer-readable medium described above may further include processes, features, means, or instructions for performing rate matching to encode and modulate the priority transmissions that may be transmitted using resources proximate to the resources of the CSI-RSs.

Some examples of the method, apparatus, and non-transitory computer-readable medium described above may further include processes, features, means, or instructions for transmitting a configuration message identifying the resources of the CSI-RSs that may have proximate resources used for the priority transmissions.

Some examples of the method, apparatus, and non-transitory computer-readable medium described above may further include processes, features, means, or instructions for preempting resources for greater than a defined number of DMRSs during the time period, wherein the selected reference signal preemption response scheme comprises refraining from receiving HARQ feedback information for the time period.

Some examples of the method, apparatus, and non-transitory computer-readable medium described above may further include processes, features, means, or instructions for preempting resources for less than a defined number of DMRSs during the time period, wherein the selected reference signal preemption response scheme comprises receiving HARQ feedback information based on the DMRSs that may be not preempted during the time period.

Some examples of the method, apparatus, and non-transitory computer-readable medium described above may further include processes, features, means, or instructions for identifying one or more CBGs that may be proximate to the resources of the DMRSs that may be not preempted during the time period. Some examples of the method, apparatus, and non-transitory computer-readable medium described above may further include processes, features, means, or instructions for encoding the one or more CBGs.

Some examples of the method, apparatus, and non-transitory computer-readable medium described above may further include processes, features, means, or instructions for transmitting a configuration message identifying the CBGs.

DETAILED DESCRIPTION

In some wireless systems, wireless devices such as a base station and/or a user equipment (UE) may perform wireless communications of various data types and/or priorities. In some aspects, resources for lower priority data packets may be shared with higher priority data packets. For example, high priority data packets may arrive for priority transmission and the transmitting device may puncture the resources allocated for the lower priority data packets with the higher priority data packets. In some examples, however, the priority transmission may preempt resources otherwise allocated to reference signals (RSs). The RSs are typically used by the UE and base station for channel performance measurement and reporting, for decoding and demodulation operations, and the like. Thus, the system may be negatively impacted when the priority transmissions preempt the resources for the RSs during a particular time period (e.g., slot). Conventional wireless communication systems are not configured to support (e.g., how to respond to) the loss of RSs during the time period.

Aspects of the disclosure are initially described in the context of a wireless communications system. Aspects of the present disclosure provide for implementation of a RS preemption response scheme that supports RS(s) being preempted during a time period. For example, the RS preemption response scheme may be selected based on the number of RSs that have been preempted, based on the particular type of RS that has been preempted, and the like. As one example, a RS preemption response scheme may be selected to determine how the UE and base station perform channel measurement and reporting when resources for channel state information reference signal (CSI-RS)(s) are preempted. As another example, a RS preemption response scheme may be selected to determine how the UE and base station perform decoding and demodulation when resources for demodulation reference signal (DMRS)(s) are preempted. Accordingly, the UE may determine that resources for RS(s) have been preempted and then select and implement the RS preemption response scheme based on the preempted RS(s).

Aspects of the disclosure are further illustrated by and described with reference to apparatus diagrams, system diagrams, and flowcharts that relate to RS and preempted resources collision handling.

Figure 1:
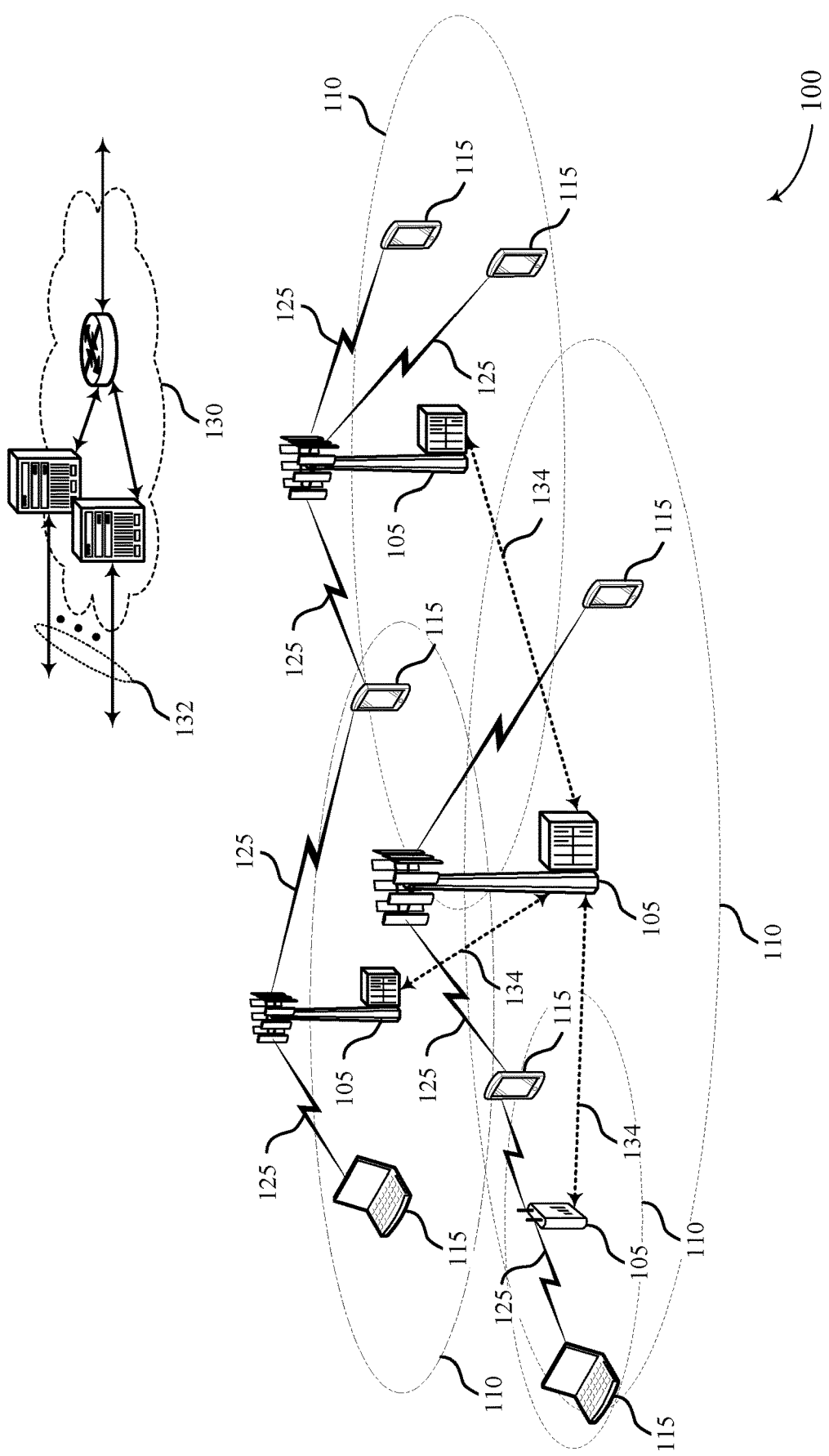
FIG. 1 illustrates an example of a system for wireless communication that supports reference signal (RS) and preempted resources collision handling in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band.

The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Channel state information (CSI) may refer to a general term for information describing characteristics of the radio channel, typically indicating the complex transfer function matrix between one or more transmit antennas and one or more receive antennas. A base station 105 may gather channel condition information from a UE 115 in order to efficiently configure and schedule the channel. This information may be sent from the UE 115 in the form of a channel state report. A channel state report may contain an RI requesting a number of layers to be used for downlink transmissions (e.g., based on the antenna ports of the UE 115), a PMI indicating a preference for which precoder matrix should be used (based on the number of layers), and a channel quality information (CQI) representing the highest MCS that may be used. CQI may be calculated by a UE 115 after receiving predetermined pilot symbols such as cell specific reference signal (CRS) or CSI-RS. RI and PMI may be excluded if the UE 115 does not support spatial multiplexing (or is not in support spatial mode). The types of information included in the report determines a reporting type. Channel state reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE selected reports indicating a subset of the best subbands, or configured reports in which the subbands reported are selected by the base station 105.

In some aspects, a base station 105 may transmit a configuration message indicating a reference signal preemption scheme associated with one or more reference signal resources being preempted for priority transmissions during a time period. The base station 105 may preempt resources of one or more reference signals during the time period and in accordance with the reference signal preemption scheme. The base station 105 may implement a reference signal preemption response scheme that is selected based at least in part on the resources of the one or more reference signals being preempted.

In some aspects, a UE 115 may identify a reference signal preemption scheme associated with one or more reference signal resources being preempted for priority transmissions during a time period. The UE 115 may determine that resources of one or more reference signals have been preempted during the time period and in accordance with the reference signal preemption scheme. The UE 115 may implement a reference signal preemption response scheme that is selected based at least in part on the resources of the one or more reference signals being preempted.

Figure 2:
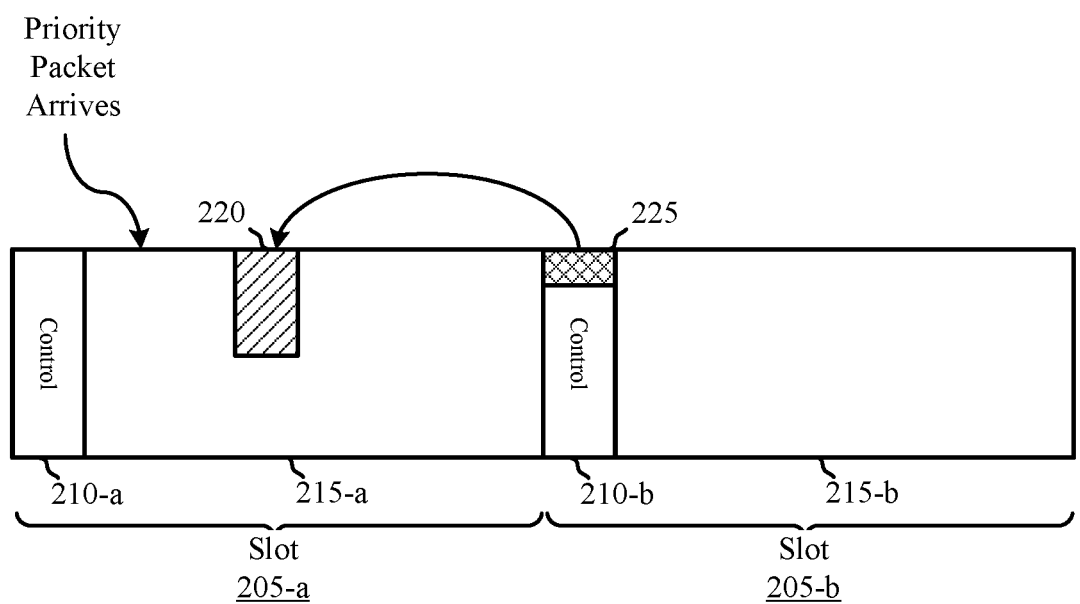
FIG. 2 illustrates an example of a timing diagram that supports RS and preempted resources collision handling in accordance with aspects of the present disclosure.

FIG. 2 illustrates an example of a timing diagram 200 that supports RS and preempted resources collision handling in accordance with various aspects of the present disclosure. In some examples, timing diagram 200 may implement aspects of wireless communication system 100. Aspects of timing diagram 200 may be implemented by a UE and/or base station, which may be examples of the corresponding device described herein. Broadly, timing diagram 200 illustrates one example of a system where a RS preemption response scheme is implemented by a base station and/or UE that is selected based on RS resource(s) being preempted in a slot by priority transmissions.

Timing diagram 200 may include two slots 205. Each slot 205 may generally include a control portion 210 and a data portion 215. In some aspects, each slot 205 may include a plurality of resource elements (REs), each of which includes one symbol period and one carrier. Each slot 205 may also be referred to as a time period. Each slot 205 may be a traditional slot spanning 0.5 ms, 0.25 ms, 0.125 ms, or some other configured slot, such as a mini-slot.

The control portion 210 may generally include various control signals associated with performing wireless communications. Examples of such control signals may include, but are not limited to, downlink control information (DCI) (e.g., either UE-specific or a group common DCI), physical downlink control channel (PDCCH) signaling, physical uplink control channel (PUCCH) signaling, and the like. Such control signals may carry various grant information, MCS indications, and the like.

The data portion 215 may generally carry the data payload (e.g., data packets) as well as various resources allocated for RS transmissions. The data portion 215 may include physical downlink shared channel (PDSCH) signals, physical uplink shared channel (PUSCH) signals, and the like. The data packets may be associated with various transmission types, e.g., priority and/or non-priority transmissions. The data portion 215 may also carry various RS(s), such as CSI-RSs that are generally used for channel performance measurement and reporting, DMRSs that are generally used by the receiving device for decoding and demodulation, tracking reference signal (TRS)(s) that may be used to update/track time frequency alignment, phase tracking reference signal (PTRS)(s) that may be used for phase updating and tracking, and the like.

Generally, wireless communications may include the base station transmitting control information in the control portion 210 of the slot 205 and then data packets/RSs in the data portion 215. The control signaling may indicate which resources of the data portion 215 have been allocated for wireless communications, e.g., identify which time and/or frequency resources of the data portion 215 have been allocated for communicating data packets, RSs, and the like. Timing diagram 200 may support dynamic resource sharing between different transmission types, such as URLLC and eMBB data packet types. Resource sharing may include the base station puncturing the data portion 215 with high priority data packets, e.g., preempting resources for data packets and/or RSs otherwise allocated for the lower priority data packets in the data portion 215.

As one example, the base station may transmit the control portion 210-a during the slot 205-a that includes an allocation of the resources for the data portion 215-a. The allocated resources may be resources for RSs and data packets, e.g., normal or lower priority data packets. However, after the control portion 210-a is transmitted, priority packets may arrive at the base station for transmission. The priority packets may be associated with URLLC, in some examples, which includes low latency communication requirements. Accordingly, the base station may preempt resource portion 220 of the data portion 215-a with the priority transmission data packets, e.g., puncture the high priority data packets into the resource portion 220 and therefore preempt previously scheduled data packets/RS(s). Resource portion 220 may include various data packet and/or RS resources that are therefore preempted during the slot 205-a in accordance with a RS preemption scheme. Generally, the RS preemption scheme may include or otherwise indicate which resources of the resource portion 220 have been preempted with the priority transmissions. As the resource allocation indicated in the control portion 210-a has already been transmitted, the UE may buffer the contents of the data portion 215-a.

During the slot 205-b, the control portion 210-b may include or otherwise convey a preemption indicator (PI) that indicates the RS preemption scheme. The PI may be communicated in a configuration message 225 during the control portion 210-b. In some aspects, a group common DCI (GC-DCI) may carry or otherwise indicate the PI. In some aspects, the PI may be indicated using a bitmap (e.g., a fixed payload size) that indicates preemption for one or more time/frequency domain resources of the data portion 215-a.

Accordingly, the UE may use the RS preemption scheme to determine which resource(s) of the RS have been preempted during the data portion 215-a of the slot 205-a. Based on that determination of which resources of the RSs are preempted, the UE and/or base station may implement a RS preemption response scheme. Broadly, the RS preemption response scheme may outline actions/expectations that the UE and/or base station may take given that resources for RS(s) have been preempted. As RSs are typically communicated during a data portion 215 for a certain purpose, the RS preemption response scheme may be selected based on which type of RS(s) have been preempted and/or how many of the RS(s) have been preempted during the data portion 215-a. In some aspects, the RS preemption response scheme may include a hybrid approach that includes multiple responses when different types of RSs are preempted, e.g., aspects of a response scheme for CSI-RS preemption may be combined with aspects of a response scheme for DMRS preemption.

In one example where CSI-RS(s) may be preempted, the RS preemption response scheme may include UE-specific CSI-RS resource(s) (e.g., either periodic or aperiodic) for CSI acquisition being preempted by priority transmissions. In one approach, the UE may ignore the CSI-RS resources and drop or otherwise refrain from performing CSI reporting associated with the CSI-RS resources (e.g., channel performance measurement and reporting). In one approach, if the UE has been configured with subband CQI reporting and the bandwidth part (BWP) is partially preempted (e.g., a first portion of the BWP that includes preempted CSI-RS resources), the UE may measure and reports CQI for the non-preempted part of the BWP (e.g., a second portion of the BWP that does not include preempted CSI-RS resources).

In some aspects, the priority transmissions (e.g., URLLC data packets) may rate match around the resources of the non-preempted CSI-RS, e.g., CSI-RS may not be punctured or otherwise preempted. Accordingly, the URLLC scheduling grant may include a field that indicates the existence and/or pattern of the CSI-RS resources. In some instances, pre-configuration information can also be used with respect to the indication. Accordingly, the UE (e.g., an eMBB UE) may monitor the CSI-RS and be configured or indicated to know that the CSI-RS is not affected by the priority transmissions (e.g., URLLC data packets). That is, the UE may ignore preemption of CSI-RS and instead perform rate matching around the CSI-RS resources to decode and demodulate the priority transmission data packets.

In another example where DMRS(s) may be preempted, the RS preemption response scheme may be implemented when the preempted DMRS resources reduce or omit the transmission of the DMRSs during the resource portion 220. In one approach where all DMRS symbols (e.g., both front-loaded and additional DMRS resources) and/or more than a defined number and/or pattern of DMRS symbols are preempted, the UE may ignore the entire scheduled slot 205-a and not try to decode or demodulate the data packets carried in the slot 205-a. In some aspects, this may include the UE not transmitting HARQ feedback for the slot 205-a. However, the RS preemption response scheme implemented by the base station may include the base station not expecting to receive the HARQ feedback information and, instead, automatically scheduling retransmission of the data packets for the UE.

In some aspects where only a small portion of the entire DMRS resources are preempted, the UE may perform partial decoding of code-block groups (CBGs) that are relatively close to non-preempted DMRS resources. If the UE has been configured with CBG-based retransmission, the base station may transmit CBGFI (CBG flushing out information) along with the PI to indicate the CBGs impacted by the preemption.

In some aspects, the RS preemption response scheme may include a special preemption mode being defined that only affects unicast data (e.g., PDSCH). UEs may decode only broadcast and/or multicast data, such as system information, and may not consider this mode of PI.

In another example where TRS(s) and/or PTRS(s) may be preempted, the RS preemption response scheme may include the UE refraining from performing various tracking updates. One approach where all TRS and/or PTRS symbol(s) are preempted, the UE may not carry out time/frequency/phase tracking/update for the slot 205-a. In one approach where the TRS and/or PTRS symbol(s) are partially preempted, the UE may only use the non-preempted TRS and/or PTRS for time/frequency/phase estimation.

Figure 3A:
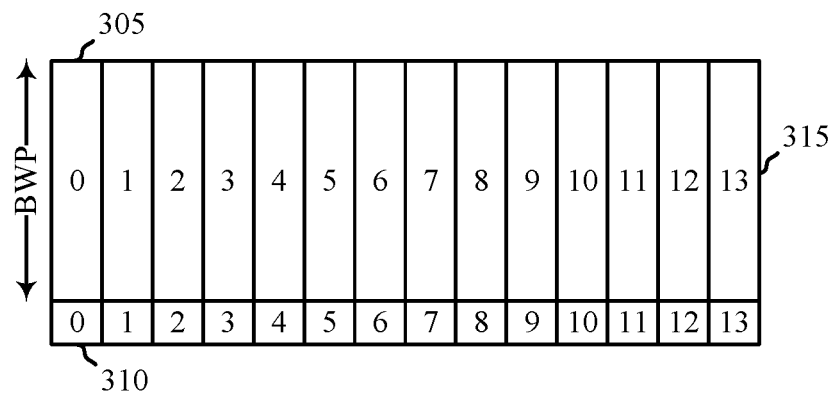
FIGS. 3A and 3B illustrate examples of a preemption indication scheme that supports RS and preempted resources collision handling in accordance with aspects of the present disclosure.
Figure 3B:
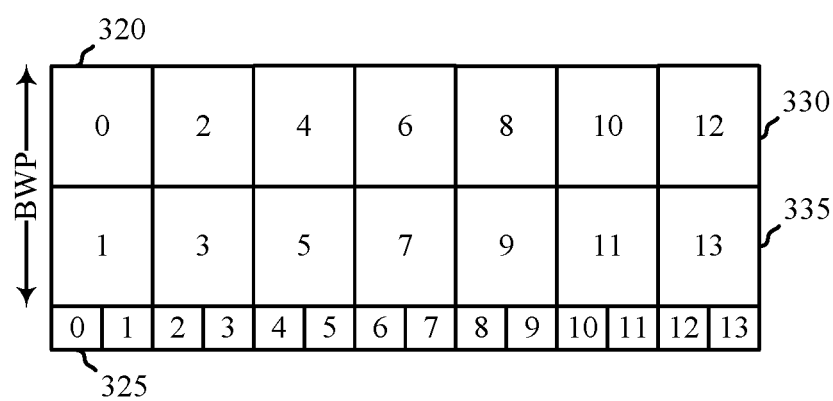

FIGS. 3A and 3B illustrate examples of a preemption indication (PI) scheme 300 that supports RS and preempted resources collision handling in accordance with various aspects of the present disclosure. In some examples, PI scheme 300 may implement aspects of wireless communication system 100 and/or timing diagram 200. Aspects of PI scheme 300 may be implemented by a UE and/or a base station, which may be examples of the corresponding device described herein. Broadly, PI scheme 300 illustrates one example of preemption indication configuration signaled during a configuration message, such as configuration message 225 of timing diagram 200.

In some aspects, a GC-DCI may be used to carry or otherwise convey the PI scheme 300. For example, a bitmap pattern (e.g., a fixed payload size bitmap pattern) may be used to indicate preemption for one or more time/frequency domain parts of the time period. As one example, the bitmap pattern may include N frequency domain parts and M time domain parts. FIG. 3A illustrates one example where {M,N}={14,1} and FIG. 3B illustrates one example where {M,N}={7,2}.

Thus and referring first to FIG. 3A, PI scheme 300-a may include a plurality of bits 310, wherein each bit corresponds to a symbol 305. The bitmap pattern for PI scheme 300-a may include 14 bits indicating 14 time domain parts of the preempted RS resources and one frequency domain part of the preempted RS resources. Thus, the bits 310 may be selected for the configuration message to indicate which symbols 305 of the time period have resources for RS(s) that have been preempted for priority transmissions. The PI scheme 300-a is associated with a single carrier 315, i.e., where the BWP corresponds to one carrier, and accordingly the bitmap pattern may indicate one frequency domain part of the preempted RS resources.

Referring next to FIG. 3B, PI scheme 300-b may include a plurality of bits 325, wherein two bits corresponds to a symbol 320. The bitmap pattern for PI scheme 300-b may include 14 bits indicating seven time domain parts of the preempted RS resources and two frequency domain parts of the preempted RS resources. Thus, the bits 325 may be selected for the configuration message to indicate which symbols 320 of the time period have resources for RS(s) that have been preempted for priority transmissions. The PI scheme 300-b may be associated with a first portion 330 of the BWP and a second portion 335 of the BWP, i.e., where the BWP corresponds to two or more tones, subcarriers, carriers, etc., and accordingly the bitmap pattern may indicate two frequency domain parts of the preempted RS resources.

Figure 4:
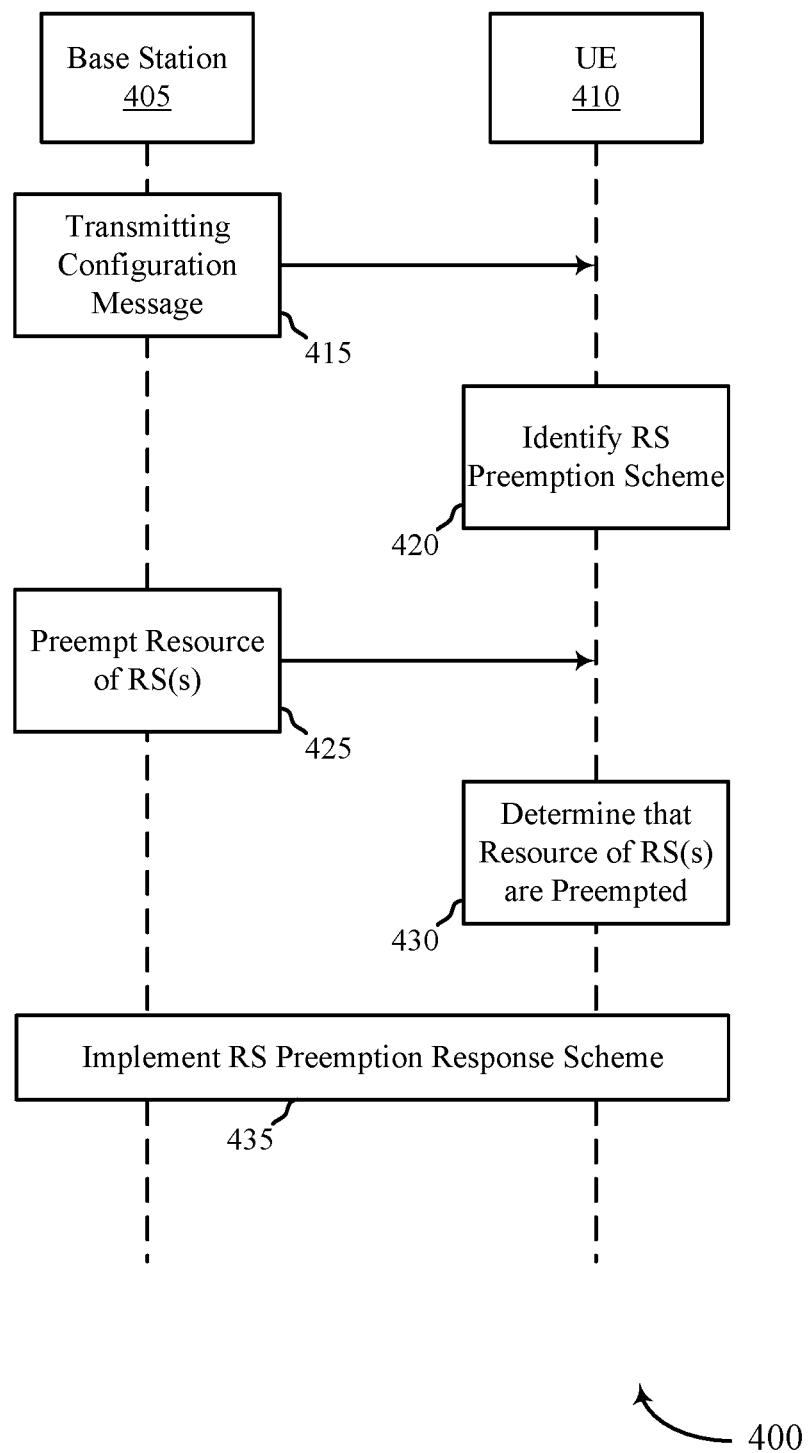
FIG. 4 illustrates an example of a process that supports RS and preempted resources collision handling in accordance with aspects of the present disclosure.

FIG. 4 illustrates an example of a process 400 that supports RS and preempted resources collision handling in accordance with various aspects of the present disclosure. In some examples, process 400 may implement aspects of wireless communication system 100, timing diagram 200, and/or PI scheme 300. Process 400 may include a base station 405 and a UE 410, which may be examples of the corresponding devices described herein.

At 415, base station 405 may transmit (and UE 410 may receive) a configuration message. The configuration message may indicate a RS preemptions scheme for RS resource(s) being preempted for priority transmissions during a time period, e.g., during a slot. The configuration message may be transmitted in a subsequent time period, e.g., in a slot following the slot in which the RS resource(s) are being preempted.

At 420, UE 410 may identify the RS preemption scheme. The UE 410 may identify the RS preemption scheme based on the configuration message and/or based on preconfigured information previously received.

At 425, base station 405 may transmit (and UE 410 may receive) a signal including preempted RS resource(s). The signal may be transmitted during a data portion of the time period. The RS resource(s) may be preempted in accordance with the RS preemption scheme.

At 430, UE 410 may determine that resources of the RS(s) are preempted during the time period and in accordance with the RS preemption scheme. That is, the UE 410 may identify which RS resource(s) that were previously allocated for RS transmission have been punctured with the priority transmission packets.

At 435, base station 405 and UE 410 may implement a RS preemption response scheme that is selected based on the RS resource(s) being preempted.

In some aspects, this may include determining that resources for greater than a defined number of CSI-RSs have been preempted during the time period. Thus, the selected RS preemption response scheme may include UE 410 avoiding performing channel measurement and reporting during the time period.

In some aspects, this may include determining that resources for greater than a defined number of CSI-RSs have been preempted for a first portion of a BWP during the time period. Thus, the selected RS preemption response scheme may include UE 410 performing channel measurement and reporting during the time period on a second portion of the BWP that is different from the first portion.

In some aspects, this may include determining that resources for CSI-RSs have not been preempted during the time period and the base station 405 and UE 410 performing rate matching to encode/decode and modulate/demodulate the priority transmissions that are transmitted using resources proximate to the resources of the CSI-RSs. For example, base station 405 may transmit and UE 410 may receive a configuration message identifying the resources of the CSI-RSs that have proximate resources used for the priority transmissions.

In some aspects, this may include determining that resources for greater than a defined number of DMRSs have been preempted during the time period. Thus, the selected reference signal preemption response scheme may include UE 410 refraining from performing decoding and demodulation of the transmissions occurring during the time period. In some aspects, UE 410 may also refrain from transmitting HARQ feedback information for the time period.

In some aspects, this may include determining that resources for less than a defined number of DMRSs have been preempted during the time period. Thus, the selected reference signal preemption response scheme may include UE 410 performing channel decoding and demodulation during the time period for DMRSs that are not preempted during the time period. In some aspects, this may include UE 410 identify one or more CBGs that are proximate to the resources of the DMRSs that are not preempted during the time period and decoding the one or more CBGs. The base station 405 may transmit and UE 410 may receive a configuration message identifying the one or more CBGs.

In some aspects, this may include determining that resources for unicast DMRSs have been preempted during the time period. Thus, the selected reference signal preemption response scheme may include UE 410 refraining from decoding and demodulating the transmissions occurring during the time period.

In some aspects, this may include determining that resources for TRSs have been preempted during the time period. Thus, the selected reference signal preemption response scheme may include UE 410 refraining from performing timing and frequency updating procedures for the channel during the time period.

In some aspects, this may include determining that resources for a defined number of TRSs have been preempted during the time period. Thus, the selected reference signal preemption response scheme may include UE 410 performing timing and frequency updating procedures during the time period using TRSs that are not preempted during the time period.

In some aspects, this may include determining that resources for PTRSs have been preempted during the time period. Thus, the selected reference signal preemption response scheme may include UE 410 refraining from performing phase tracking updating procedures during the time period.

In some aspects, this may include determining that resources for a defined number of PTRSs have been preempted during the time period. Thus, the selected reference signal preemption response scheme may include UE 410 performing phase tracking updating procedures during the time period using PTRSs that are not preempted during the time period.

Figure 5:
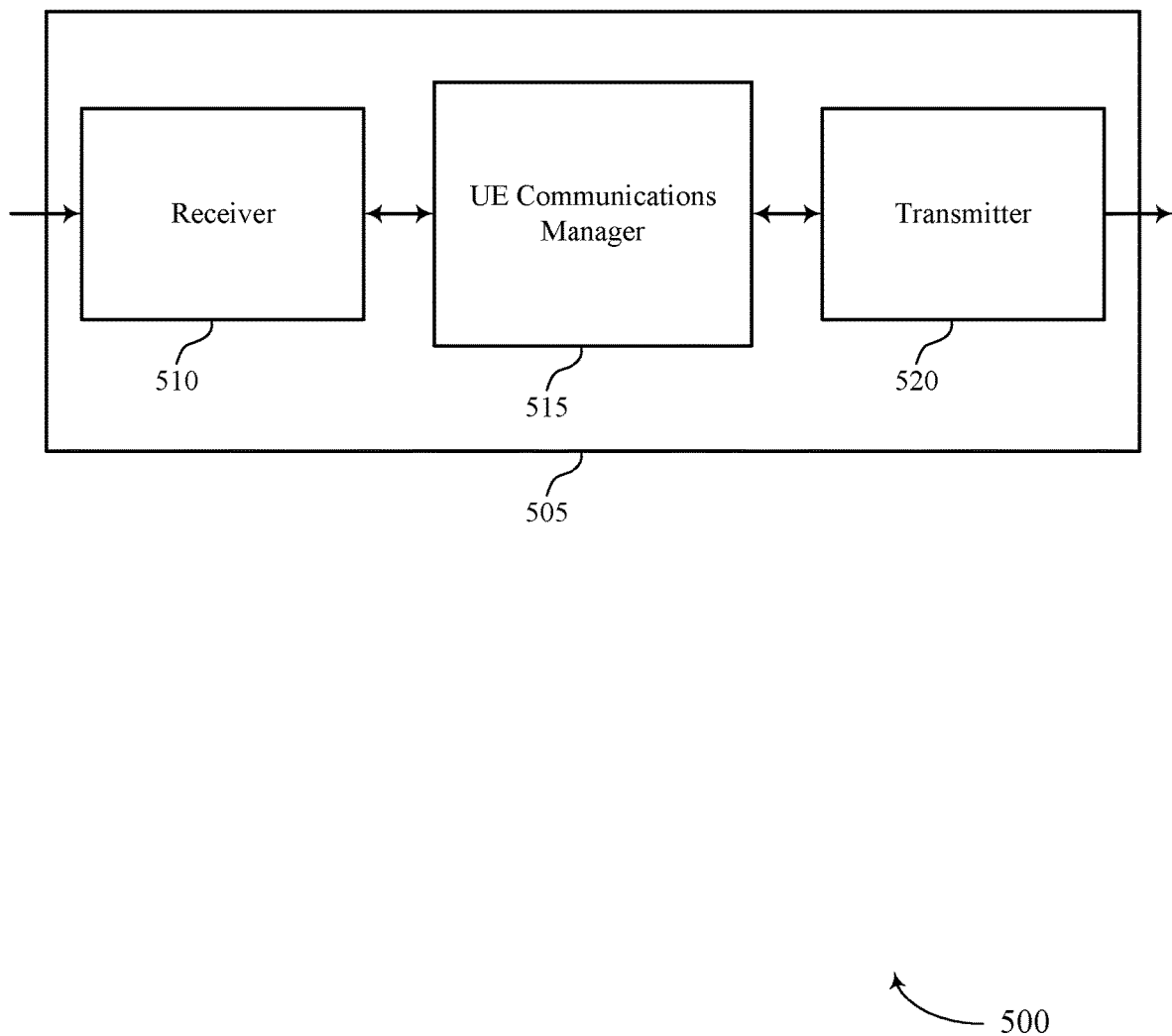
FIGS. 5 through 7 show block diagrams of a device that supports RS and preempted resources collision handling in accordance with aspects of the present disclosure.

FIG. 5 shows a block diagram 500 of a wireless device 505 that supports RS and preempted resources collision handling in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to RS and preempted resources collision handling, etc.). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8.

UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may identify a reference signal preemption scheme associated with one or more reference signal resources being preempted for priority transmissions during a time period, determine that resources of one or more reference signals have been preempted during the time period and in accordance with the reference signal preemption scheme, and implement a reference signal preemption response scheme that is selected based on the resources of the one or more reference signals being preempted.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
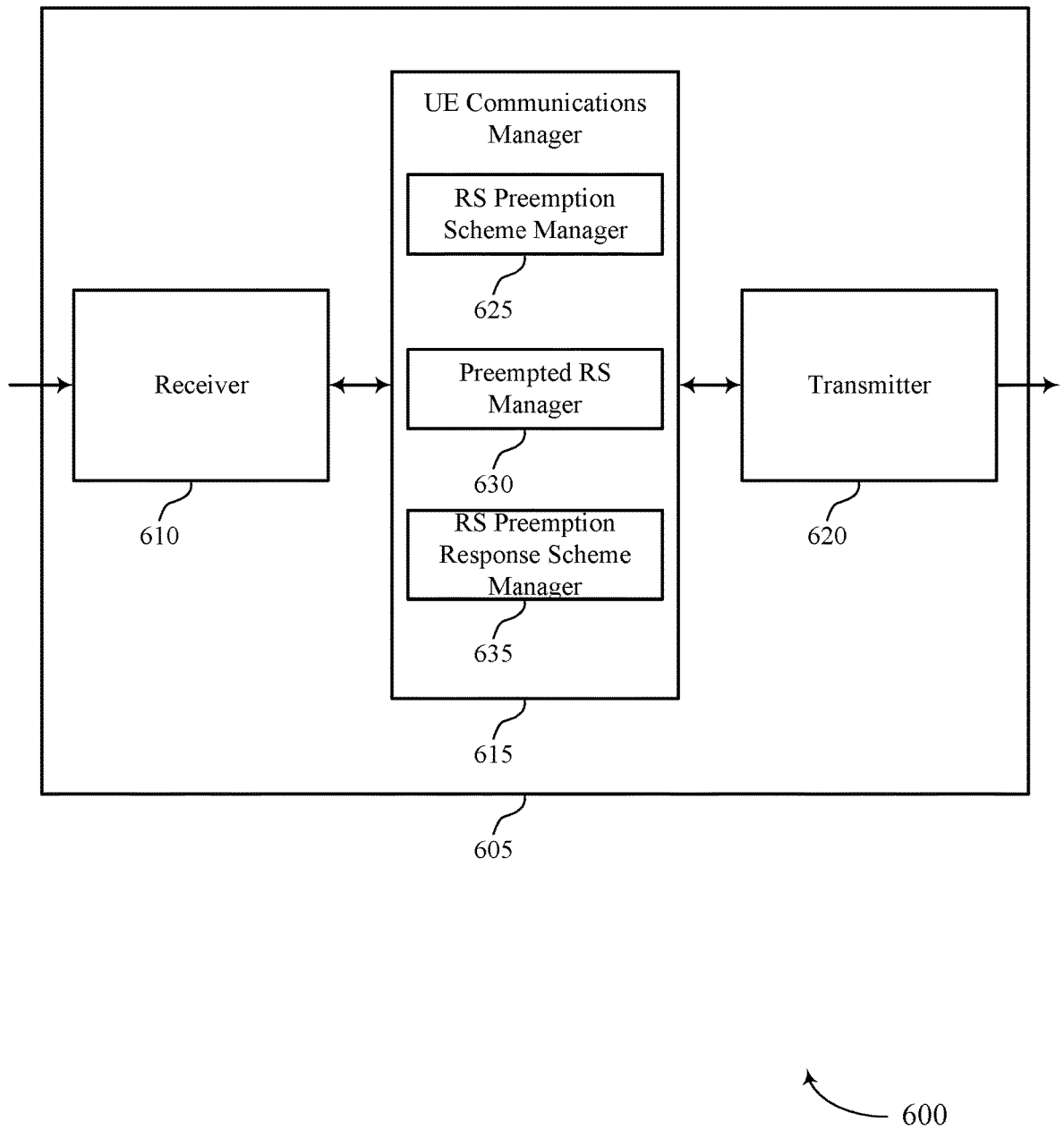

FIG. 6 shows a block diagram 600 of a wireless device 605 that supports RS and preempted resources collision handling in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to RS and preempted resources collision handling, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8.

UE communications manager 615 may also include RS preemption scheme manager 625, preempted RS manager 630, and RS preemption response scheme manager 635.

RS preemption scheme manager 625 may identify a reference signal preemption scheme associated with one or more reference signal resources being preempted for priority transmissions during a time period. In some cases, identify the reference signal preemption scheme includes: receiving a configuration message from a base station indicating the reference signal preemption scheme. In some cases, the UE is preconfigured with the reference signal preemption scheme.

Preempted RS manager 630 may determine that resources of one or more reference signals have been preempted during the time period and in accordance with the reference signal preemption scheme.

RS preemption response scheme manager 635 may implement a reference signal preemption response scheme that is selected based on the resources of the one or more reference signals being preempted.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
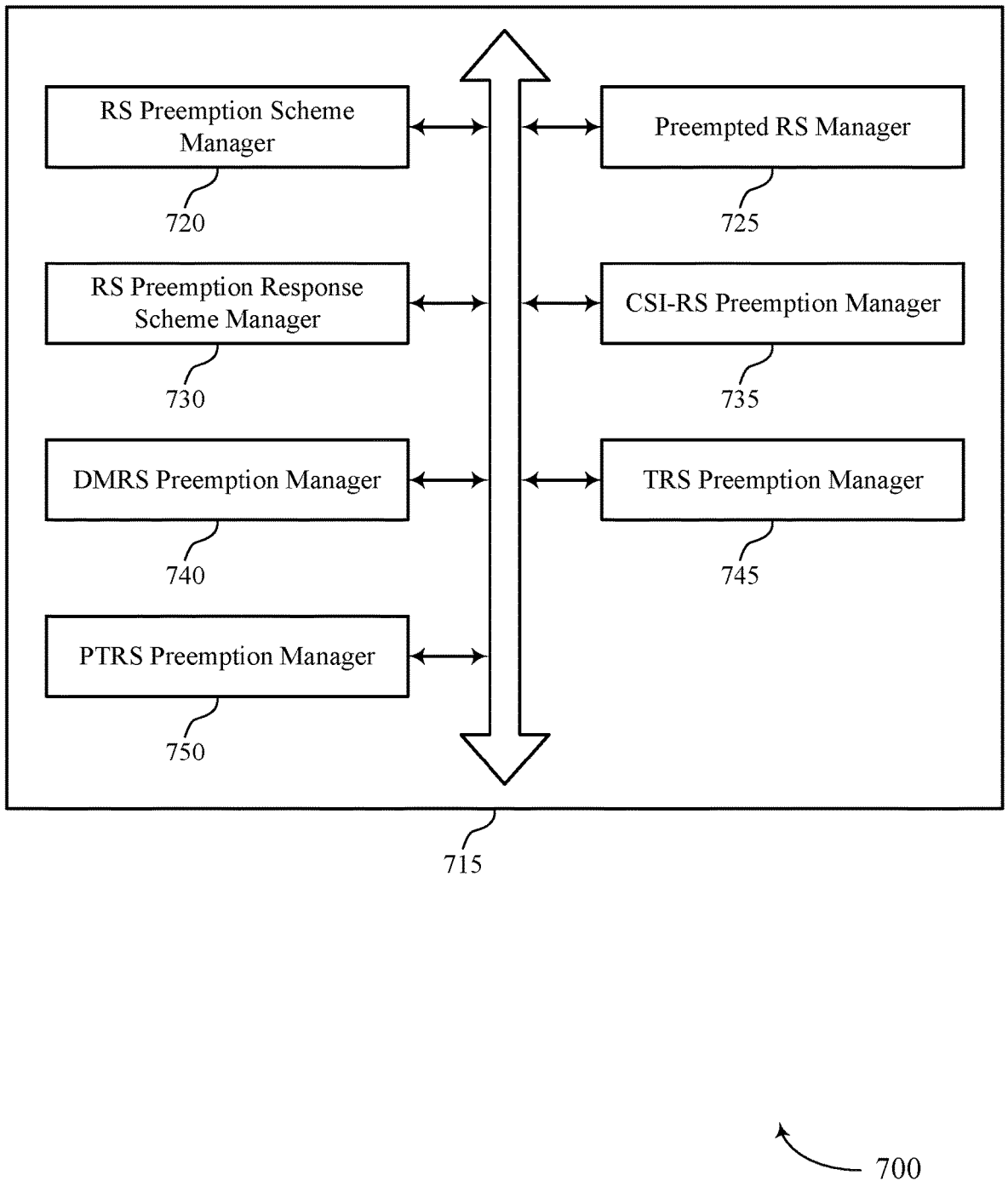

FIG. 7 shows a block diagram 700 of a UE communications manager 715 that supports RS and preempted resources collision handling in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include RS preemption scheme manager 720, preempted RS manager 725, RS preemption response scheme manager 730, channel state information (CSI)-RS preemption manager 735, DMRS preemption manager 740, TRS preemption manager 745, and PTRS preemption manager 750. Each of these modules may communicate, directly or indirectly, with one another (e.g., via one or more buses).

RS preemption scheme manager 720 may identify a reference signal preemption scheme associated with one or more reference signal resources being preempted for priority transmissions during a time period. In some cases, identify the reference signal preemption scheme includes: receiving a configuration message from a base station indicating the reference signal preemption scheme. In some cases, the UE is preconfigured with the reference signal preemption scheme.

Preempted RS manager 725 may determine that resources of one or more reference signals have been preempted during the time period and in accordance with the reference signal preemption scheme.

RS preemption response scheme manager 730 may implement a reference signal preemption response scheme that is selected based on the resources of the one or more reference signals being preempted.

CSI-RS preemption manager 735 may determine that resources for greater than a defined number of CSI-RSs have been preempted during the time period, where the selected reference signal preemption response scheme includes avoiding performing channel measurement and reporting during the time period, determine that resources for greater than a defined number of CSI-RSs have been preempted for a first portion of a bandwidth part during the time period, where the selected reference signal preemption response scheme includes performing channel measurement and reporting during the time period on a second portion of the bandwidth part that is different from the first portion, determine that resources for CSI-RSs have not been preempted during the time period, perform rate matching to decode and demodulate the priority transmissions that are transmitted using resources proximate to the resources of the CSI-RSs, and receive a configuration message identifying the resources of the CSI-RSs that have proximate resources used for the priority transmissions.

DMRS preemption manager 740 may determine that resources for greater than a defined number of DMRSs have been preempted during the time period, where the selected reference signal preemption response scheme includes refraining from performing decoding and demodulation of the transmissions occurring during the time period, refrain from transmitting HARQ feedback information for the time period, determine that resources for less than a defined number of DMRSs have been preempted during the time period, where the selected reference signal preemption response scheme includes performing channel decoding and demodulation during the time period for DMRSs that are not preempted during the time period, identify one or more CBGs that are proximate to the resources of the DMRSs that are not preempted during the time period, decode the one or more CBGs, receive a configuration message identifying the one or more CBGs, and determine that resources for unicast DMRSs have been preempted during the time period, where the selected reference signal preemption response scheme includes refraining from decoding and demodulating the transmissions occurring during the time period.

TRS preemption manager 745 may determine that resources for TRSs have been preempted during the time period, where the selected reference signal preemption response scheme includes refraining from performing timing and frequency updating procedures for the channel during the time period and determine that resources for a defined number of TRSs have been preempted during the time period, where the selected reference signal preemption response scheme includes performing timing and frequency updating procedures during the time period using TRSs that are not preempted during the time period.

PTRS preemption manager 750 may determine that resources for PTRSs have been preempted during the time period, where the selected reference signal preemption response scheme includes refraining from performing phase tracking updating procedures during the time period and determine that resources for a defined number of PTRSs have been preempted during the time period, where the selected reference signal preemption response scheme includes performing phase tracking updating procedures during the time period using PTRSs that are not preempted during the time period.

Figure 8:
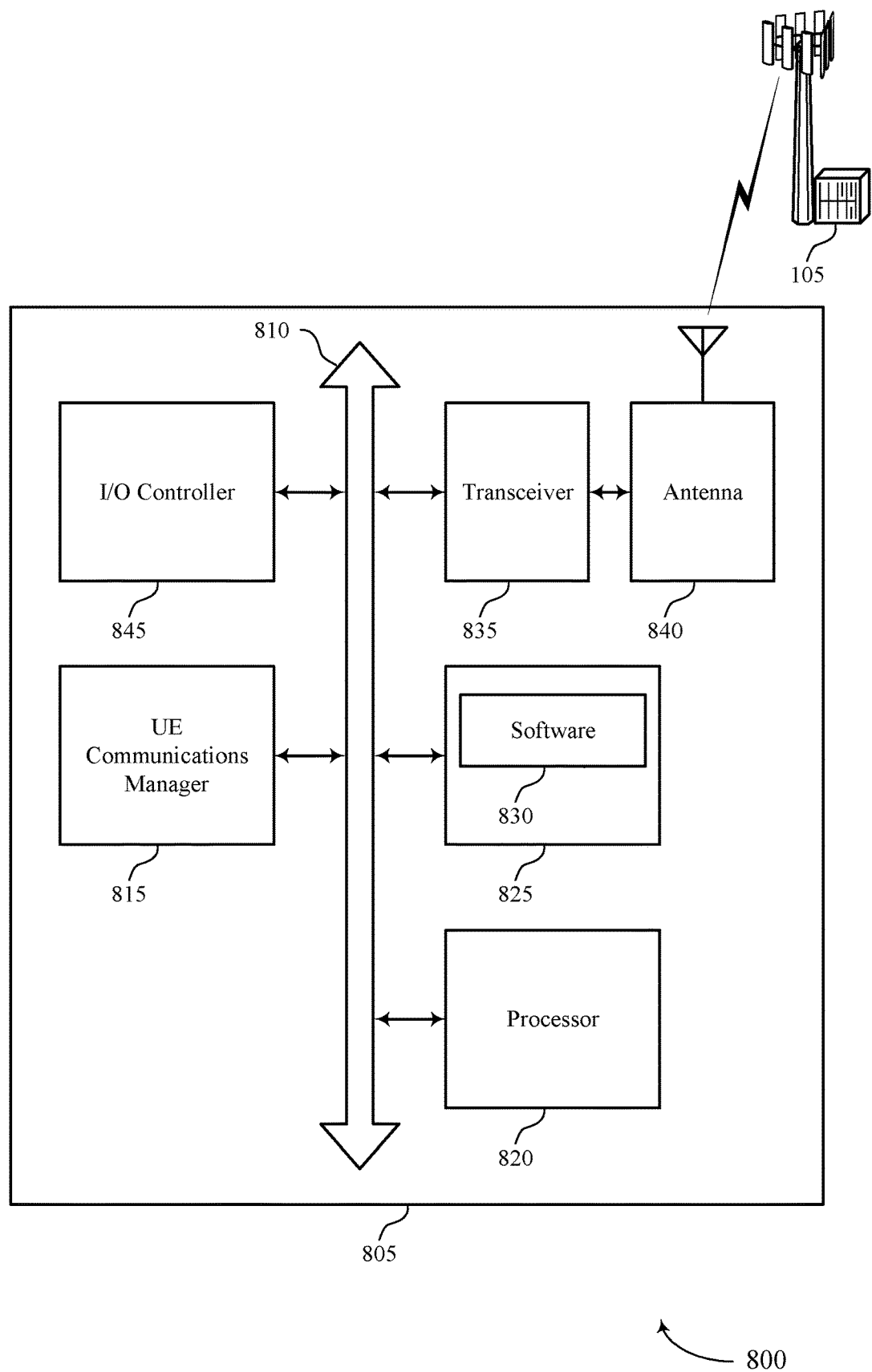
FIG. 8 illustrates a block diagram of a system including a user equipment (UE) that supports RS and preempted resources collision handling in accordance with aspects of the present disclosure.

FIG. 8 shows a diagram of a system 800 including a device 805 that supports RS and preempted resources collision handling in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting RS and preempted resources collision handling).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support RS and preempted resources collision handling. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
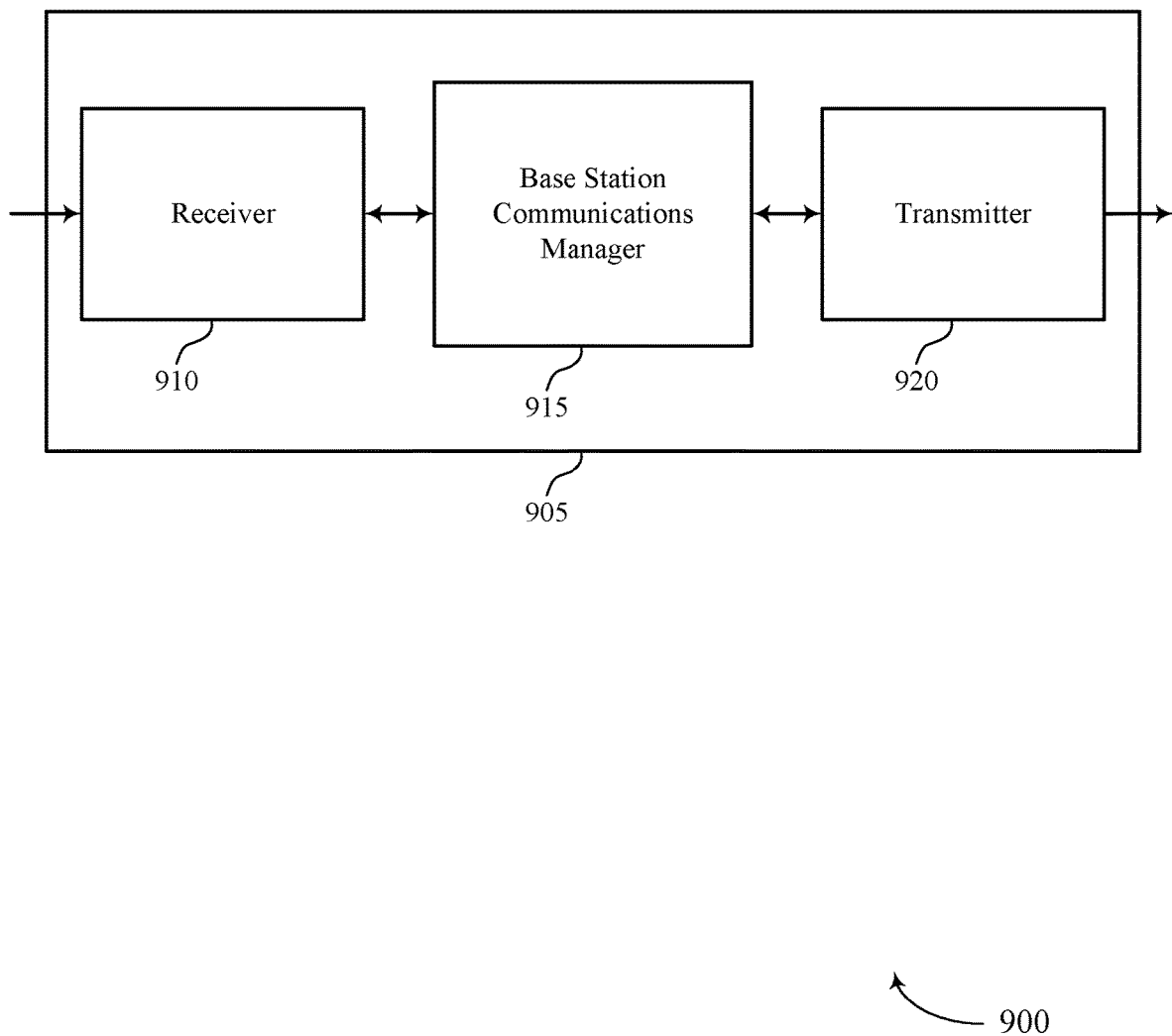
FIGS. 9 through 11 show block diagrams of a device that supports RS and preempted resources collision handling in accordance with aspects of the present disclosure.

FIG. 9 shows a block diagram 900 of a wireless device 905 that supports RS and preempted resources collision handling in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to RS and preempted resources collision handling, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12.

Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may transmit a configuration message indicating a reference signal preemption scheme associated with one or more reference signal resources being preempted for priority transmissions during a time period, preempt resources of one or more reference signals during the time period and in accordance with the reference signal preemption scheme, and implement a reference signal preemption response scheme that is selected based on the resources of the one or more reference signals being preempted.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
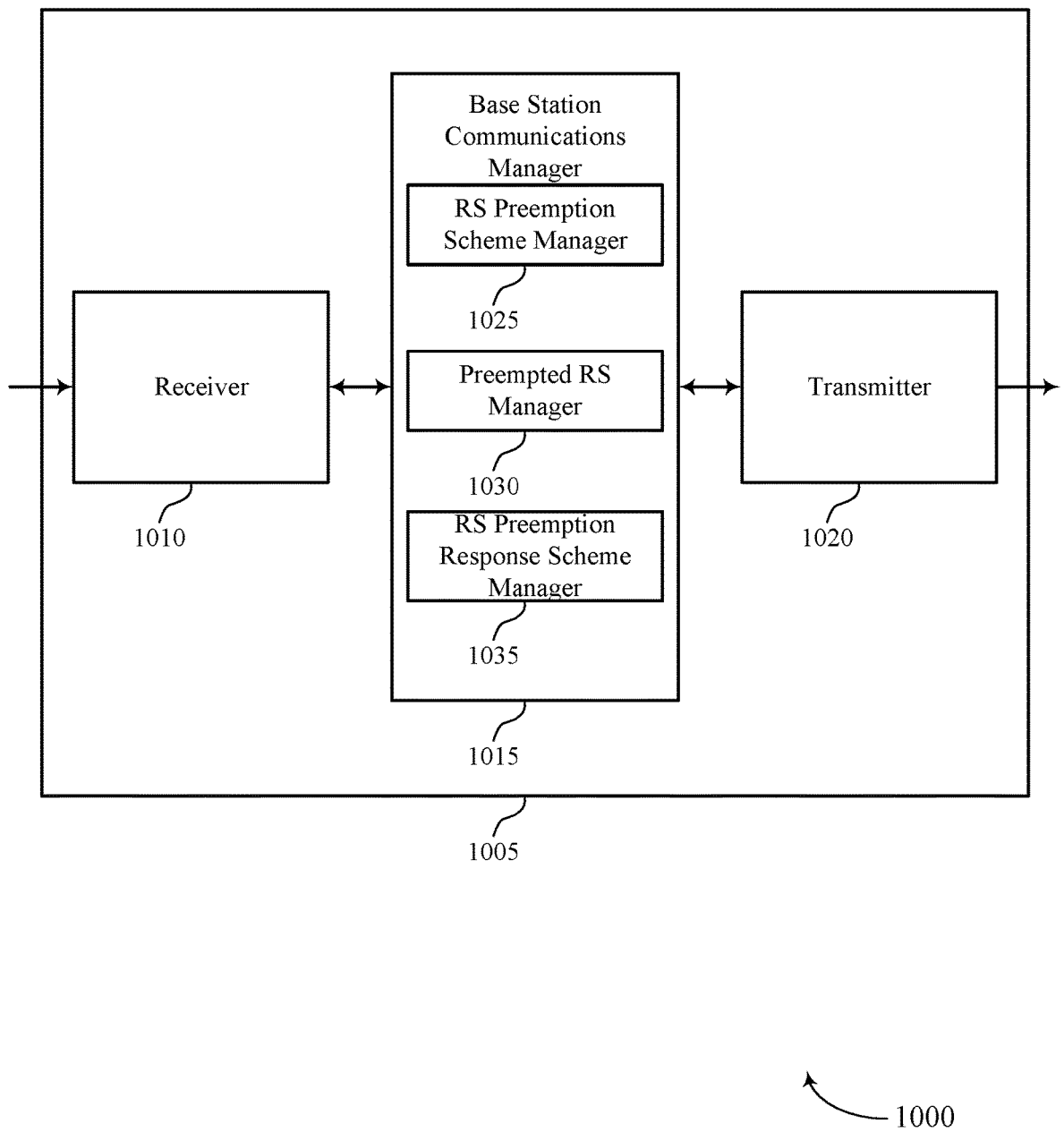

FIG. 10 shows a block diagram 1000 of a wireless device 1005 that supports RS and preempted resources collision handling in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to RS and preempted resources collision handling, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12.

Base station communications manager 1015 may also include RS preemption scheme manager 1025, preempted RS manager 1030, and RS preemption response scheme manager 1035.

RS preemption scheme manager 1025 may transmit a configuration message indicating a reference signal preemption scheme associated with one or more reference signal resources being preempted for priority transmissions during a time period.

Preempted RS manager 1030 may preempt resources of one or more reference signals during the time period and in accordance with the reference signal preemption scheme.

RS preemption response scheme manager 1035 may implement a reference signal preemption response scheme that is selected based on the resources of the one or more reference signals being preempted.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
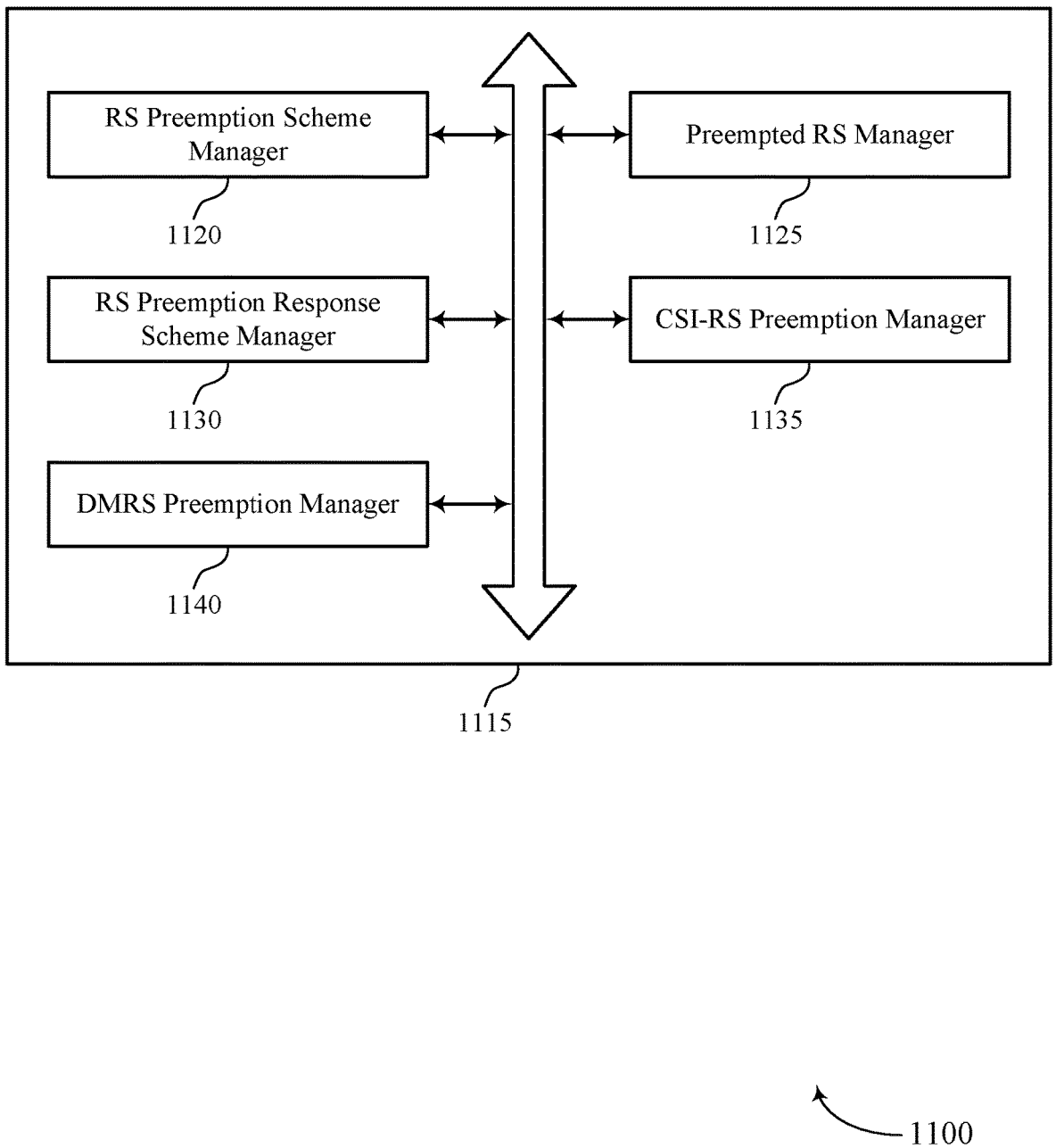

FIG. 11 shows a block diagram 1100 of a base station communications manager 1115 that supports RS and preempted resources collision handling in accordance with aspects of the present disclosure. The base station communications manager 1115 may be an example of aspects of a base station communications manager 1215 described with reference to FIGS. 9, 10, and 12. The base station communications manager 1115 may include RS preemption scheme manager 1120, preempted RS manager 1125, RS preemption response scheme manager 1130, CSI-RS preemption manager 1135, and DMRS preemption manager 1140. Each of these modules may communicate, directly or indirectly, with one another (e.g., via one or more buses).

RS preemption scheme manager 1120 may transmit a configuration message indicating a reference signal preemption scheme associated with one or more reference signal resources being preempted for priority transmissions during a time period.

Preempted RS manager 1125 may preempt resources of one or more reference signals during the time period and in accordance with the reference signal preemption scheme.

RS preemption response scheme manager 1130 may implement a reference signal preemption response scheme that is selected based on the resources of the one or more reference signals being preempted.

CSI-RS preemption manager 1135 may preempt resources for greater than a defined number of CSI-RSs during the time period, preempt resources for greater than a defined number of CSI-RSs for a first portion of a bandwidth part during the time period, where the selected reference signal preemption response scheme includes receiving channel measurement and reporting during the time period on a second portion of the bandwidth part that is different from the first portion, refrain from preempting resources for CSI-RSs during the time period, perform rate matching to encode and modulate the priority transmissions that are transmitted using resources proximate to the resources of the CSI-RSs, and transmit a configuration message identifying the resources of the CSI-RSs that have proximate resources used for the priority transmissions. In some cases, the selected reference signal preemption response scheme includes refraining from receiving channel measurement and reporting during the time period.

DMRS preemption manager 1140 may preempt resources for greater than a defined number of DMRSs during the time period, where the selected reference signal preemption response scheme includes refraining from receiving HARQ feedback information for the time period, preempt resources for less than a defined number of DMRSs during the time period, where the selected reference signal preemption response scheme includes receiving HARQ feedback information based on the DMRSs that are not preempted during the time period, identify one or more CBGs that are proximate to the resources of the DMRSs that are not preempted during the time period, encode the one or more CBGs, and transmit a configuration message identifying the CBGs.

Figure 12:
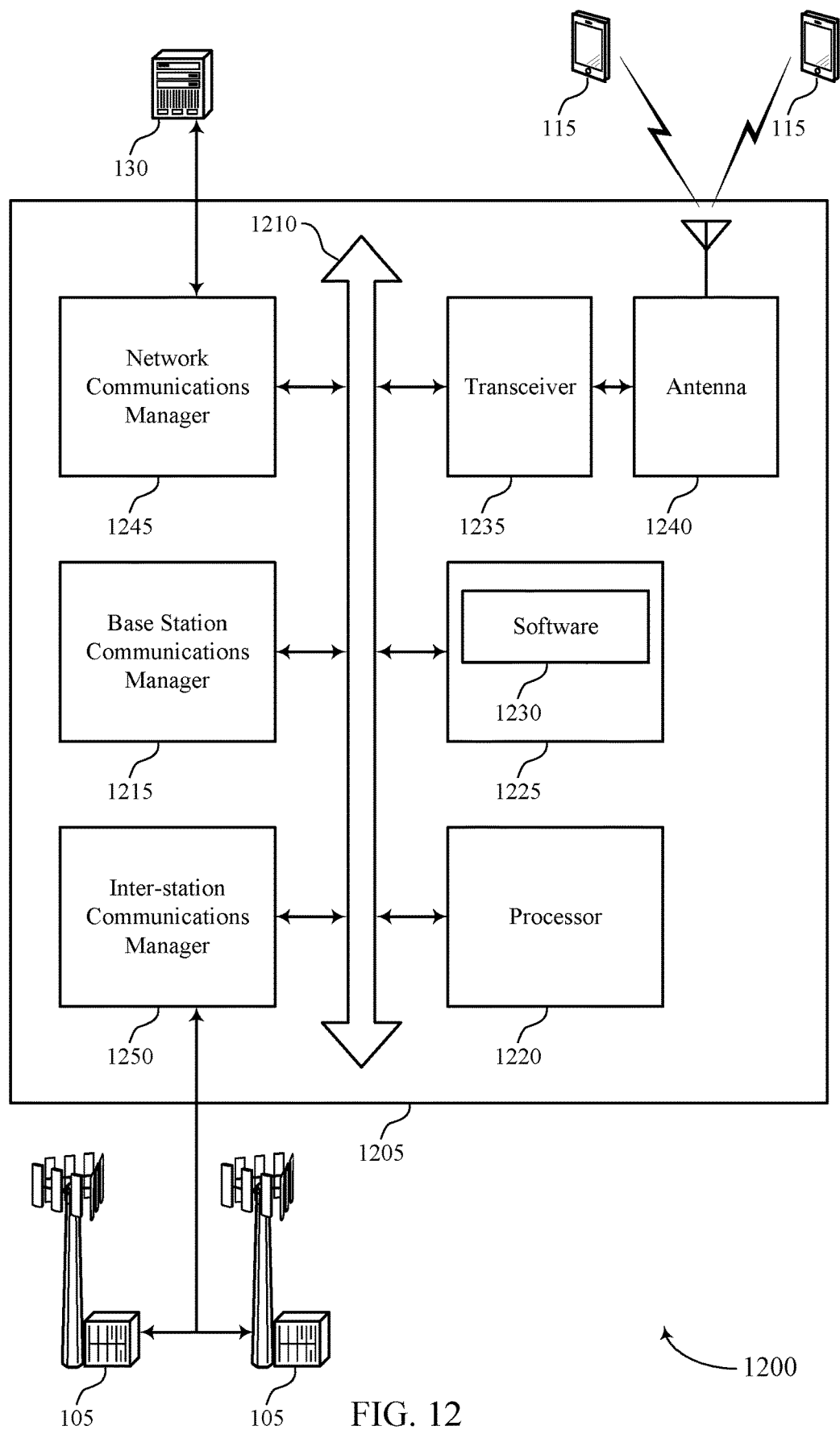
FIG. 12 illustrates a block diagram of a system including a base station that supports RS and preempted resources collision handling in accordance with aspects of the present disclosure.

FIG. 12 shows a diagram of a system 1200 including a device 1205 that supports RS and preempted resources collision handling in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting RS and preempted resources collision handling).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support RS and preempted resources collision handling. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
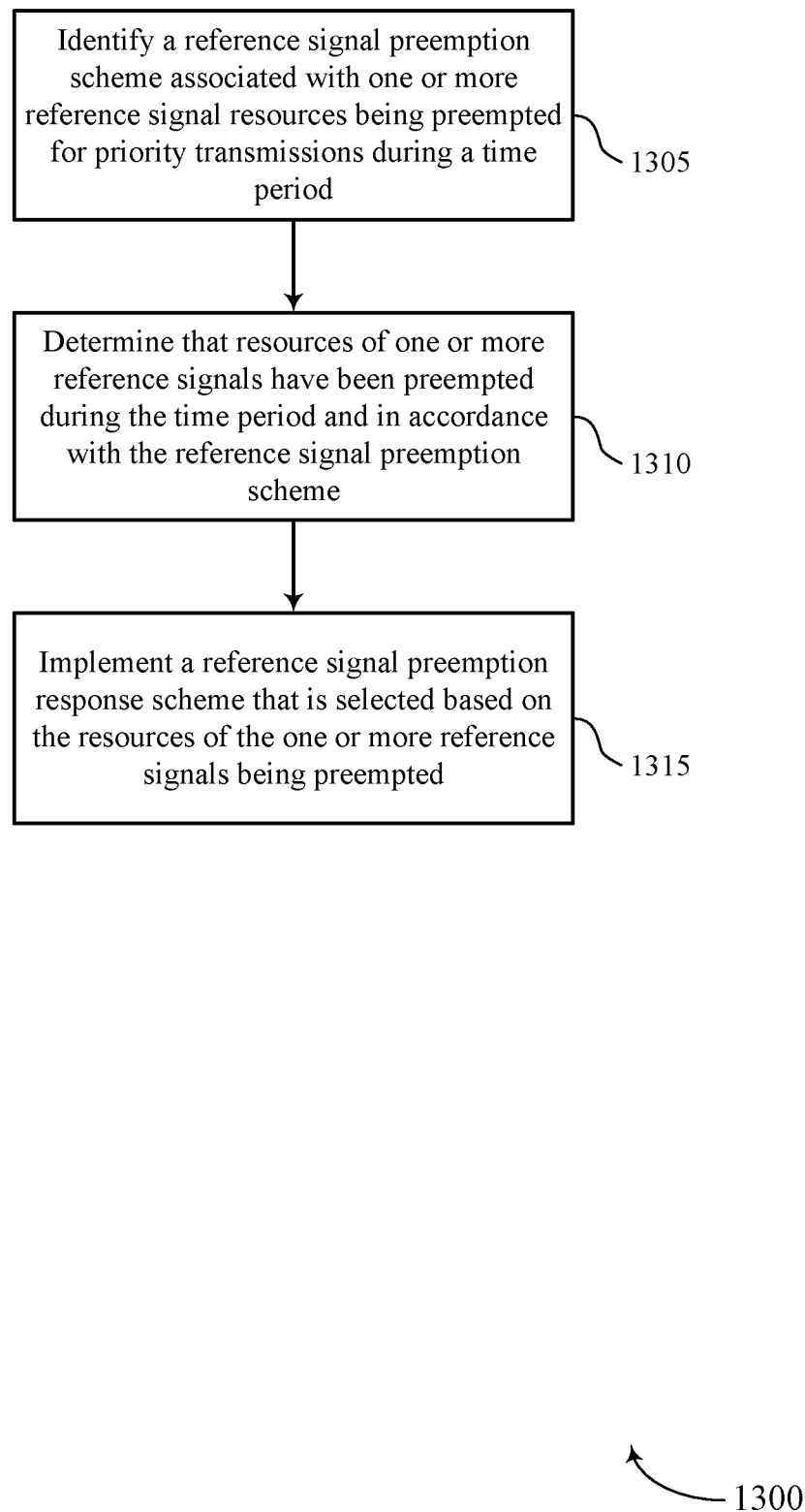
FIGS. 13 through 15 illustrate methods for RS and preempted resources collision handling in accordance with aspects of the present disclosure.

FIG. 13 shows a flowchart illustrating a method 1300 for RS and preempted resources collision handling in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may identify a reference signal preemption scheme associated with one or more reference signal resources being preempted for priority transmissions during a time period. The operations of 1305 may be performed according to the methods described herein. In certain examples, aspects of the operations of 1305 may be performed by a RS preemption scheme manager as described with reference to FIGS. 5 through 8.

At 1310 the UE 115 may determine that resources of one or more reference signals have been preempted during the time period and in accordance with the reference signal preemption scheme. The operations of 1310 may be performed according to the methods described herein. In certain examples, aspects of the operations of 1310 may be performed by a preempted RS manager as described with reference to FIGS. 5 through 8.

At 1315 the UE 115 may implement a reference signal preemption response scheme that is selected based at least in part on the resources of the one or more reference signals being preempted. The operations of 1315 may be performed according to the methods described herein. In certain examples, aspects of the operations of 1315 may be performed by a RS preemption response scheme manager as described with reference to FIGS. 5 through 8.

Figure 14:
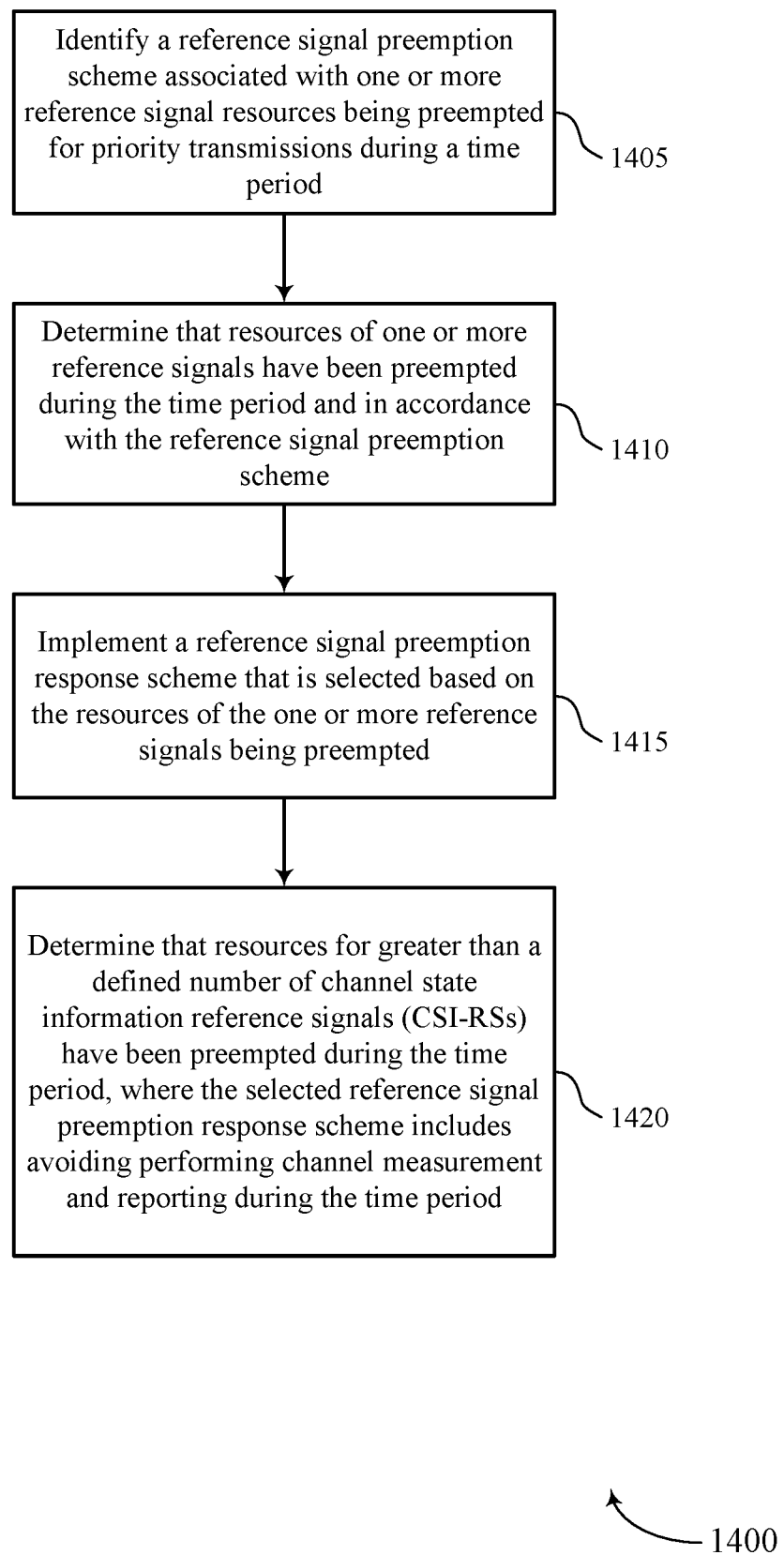

FIG. 14 shows a flowchart illustrating a method 1400 for RS and preempted resources collision handling in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may identify a reference signal preemption scheme associated with one or more reference signal resources being preempted for priority transmissions during a time period. The operations of 1405 may be performed according to the methods described herein. In certain examples, aspects of the operations of 1405 may be performed by a RS preemption scheme manager as described with reference to FIGS. 5 through 8.

At 1410 the UE 115 may determine that resources of one or more reference signals have been preempted during the time period and in accordance with the reference signal preemption scheme. The operations of 1410 may be performed according to the methods described herein. In certain examples, aspects of the operations of 1410 may be performed by a preempted RS manager as described with reference to FIGS. 5 through 8.

At 1415 the UE 115 may implement a reference signal preemption response scheme that is selected based at least in part on the resources of the one or more reference signals being preempted. The operations of 1415 may be performed according to the methods described herein. In certain examples, aspects of the operations of 1415 may be performed by a RS preemption response scheme manager as described with reference to FIGS. 5 through 8.

At 1420 the UE 115 may determine that resources for greater than a defined number of CSI-RSs have been preempted during the time period, wherein the selected reference signal preemption response scheme comprises avoiding performing channel measurement and reporting during the time period. The operations of 1420 may be performed according to the methods described herein. In certain examples, aspects of the operations of 1420 may be performed by a CSI-RS preemption manager as described with reference to FIGS. 5 through 8.

Figure 15:
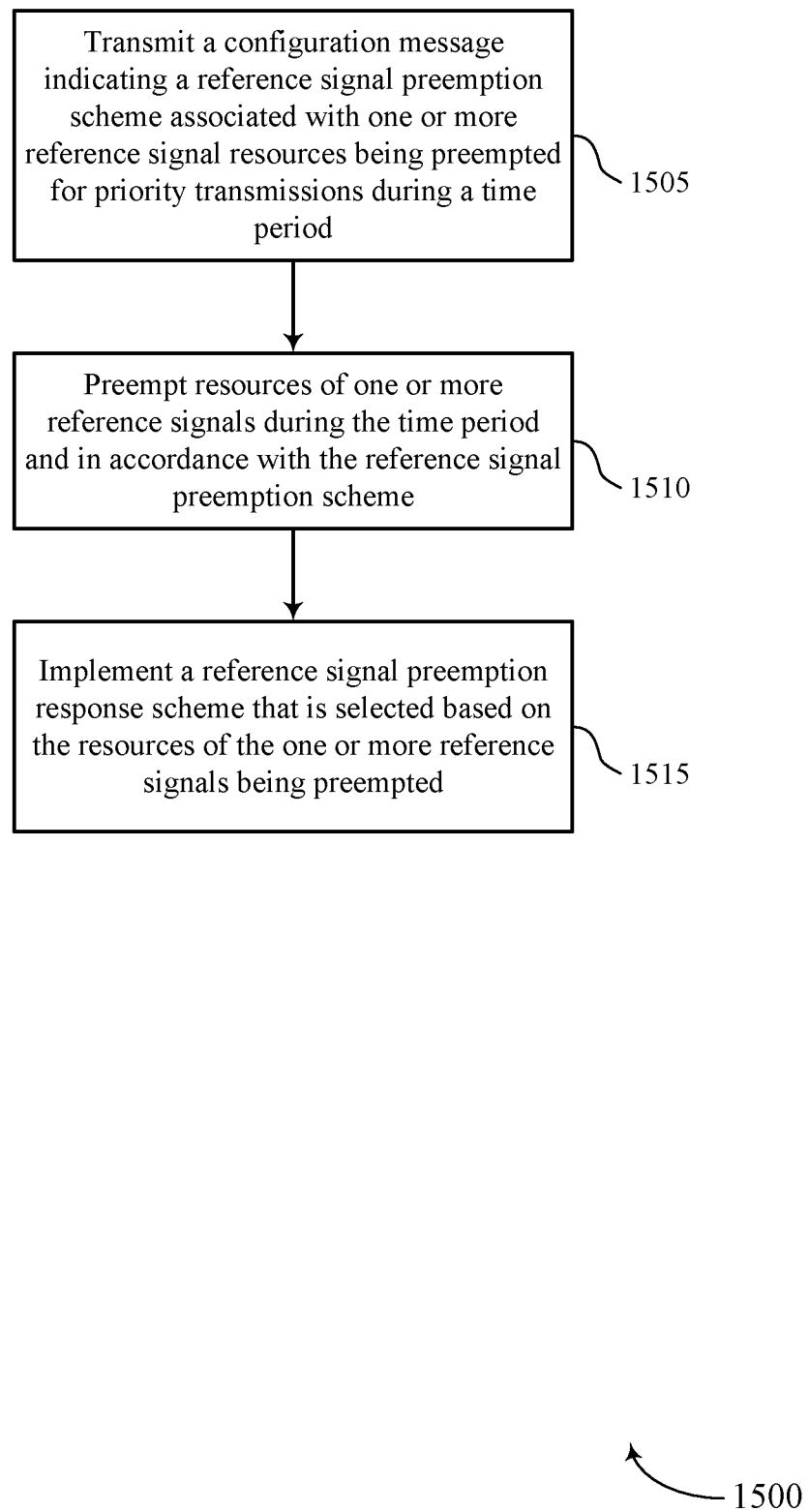

FIG. 15 shows a flowchart illustrating a method 1500 for RS and preempted resources collision handling in accordance with aspects of the present disclosure. The operations of method 1500 may be implemented by a base station 105 or its components as described herein. For example, the operations of method 1500 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1505 the base station 105 may transmit a configuration message indicating a reference signal preemption scheme associated with one or more reference signal resources being preempted for priority transmissions during a time period. The operations of 1505 may be performed according to the methods described herein. In certain examples, aspects of the operations of 1505 may be performed by a RS preemption scheme manager as described with reference to FIGS. 9 through 12.

At 1510 the base station 105 may preempt resources of one or more reference signals during the time period and in accordance with the reference signal preemption scheme. The operations of 1510 may be performed according to the methods described herein. In certain examples, aspects of the operations of 1510 may be performed by a preempted RS manager as described with reference to FIGS. 9 through 12.

At 1515 the base station 105 may implement a reference signal preemption response scheme that is selected based at least in part on the resources of the one or more reference signals being preempted. The operations of 1515 may be performed according to the methods described herein. In certain examples, aspects of the operations of 1515 may be performed by a RS preemption response scheme manager as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying, at a user equipment (UE), a reference signal preemption scheme associated with one or more reference signal resources being preempted for priority transmissions during a time period;
   determining that resources of one or more reference signals have been preempted during the time period and in accordance with the reference signal preemption scheme; and
   implementing a reference signal preemption response scheme that is selected based at least in part on the resources of the one or more reference signals being preempted.

2. The method of claim 1, further comprising:
   determining that resources for greater than a defined number of channel state information reference signals (CSI-RSs) have been preempted during the time period, wherein the selected reference signal preemption response scheme comprises avoiding performing channel measurement and reporting during the time period.

3. The method of claim 1, further comprising:
   determining that resources for greater than a defined number of channel state information reference signals (CSI-RSs) have been preempted for a first portion of a bandwidth part during the time period, wherein the selected reference signal preemption response scheme comprises performing channel measurement and reporting during the time period on a second portion of the bandwidth part that is different from the first portion.

4. The method of claim 1, further comprising:
   determining that resources for channel state information reference signals (CSI-RSs) have not been preempted during the time period; and
   performing rate matching to decode and demodulate the priority transmissions that are transmitted using resources proximate to the resources of the CSI-RSs.

5. The method of claim 4, further comprising:
   receiving a configuration message identifying the resources of the CSI-RSs that have proximate resources used for the priority transmissions.

6. The method of claim 1, further comprising:
   determining that resources for greater than a defined number of demodulation reference signals (DMRSs)

have been preempted during the time period, wherein the selected reference signal preemption response scheme comprises refraining from performing decoding and demodulation of the transmissions occurring during the time period.

7. The method of claim 6, further comprising:
refraining from transmitting hybrid automatic repeat/request (HARD) feedback information for the time period.

8. The method of claim 1, further comprising:
determining that resources for less than a defined number of demodulation reference signals (DMRSs) have been preempted during the time period, wherein the selected reference signal preemption response scheme comprises performing channel decoding and demodulation during the time period for DMRSs that are not preempted during the time period.

9. The method of claim 8, further comprising:
identifying one or more code block groups (CBGs) that are proximate to the resources of the DMRSs that are not preempted during the time period; and
decoding the one or more CBGs.

10. The method of claim 8, further comprising:
receiving a configuration message identifying the one or more CBGs.

11. The method of claim 1, further comprising:
determining that resources for unicast demodulation reference signals (DMRSs) have been preempted during the time period, wherein the selected reference signal preemption response scheme comprises refraining from decoding and demodulating the transmissions occurring during the time period.

12. The method of claim 1, further comprising:
determining that resources for tracking reference signals (TRSs) have been preempted during the time period, wherein the selected reference signal preemption response scheme comprises refraining from performing timing and frequency updating procedures for the channel during the time period.

13. The method of claim 1, further comprising:
determining that resources for a defined number of tracking reference signals (TRSs) have been preempted during the time period, wherein the selected reference signal preemption response scheme comprises performing timing and frequency updating procedures during the time period using TRSs that are not preempted during the time period.

14. The method of claim 1, further comprising:
determining that resources for phase tracking reference signals (PTRSs) have been preempted during the time period, wherein the selected reference signal preemption response scheme comprises refraining from performing phase tracking updating procedures during the time period.

15. The method of claim 1, further comprising:
determining that resources for a defined number of phase tracking reference signals (PTRSs) have been preempted during the time period, wherein the selected reference signal preemption response scheme comprises performing phase tracking updating procedures during the time period using PTRSs that are not preempted during the time period.

16. The method of claim 1, wherein identify the reference signal preemption scheme comprises:
receiving a configuration message from a base station indicating the reference signal preemption scheme.

17. The method of claim 1, wherein the UE is preconfigured with the reference signal preemption scheme.

18. A method for wireless communication, comprising:
transmitting a configuration message indicating a reference signal preemption scheme associated with one or more reference signal resources being preempted for priority transmissions during a time period;
preempting resources of one or more reference signals during the time period and in accordance with the reference signal preemption scheme; and
implementing a reference signal preemption response scheme that is selected based at least in part on the resources of the one or more reference signals being preempted.

19. The method of claim 18, further comprising:
preempting resources for greater than a defined number of channel state information reference signals (CSI-RSs) during the time period; and
the selected reference signal preemption response scheme comprises refraining from receiving channel measurement and reporting during the time period.

20. The method of claim 18, further comprising:
preempting resources for greater than a defined number of channel state information reference signals (CSI-RSs) for a first portion of a bandwidth part during the time period, wherein the selected reference signal preemption response scheme comprises receiving channel measurement and reporting during the time period on a second portion of the bandwidth part that is different from the first portion.

21. The method of claim 18, further comprising:
refraining from preempting resources for channel state information reference signals (CSI-RSs) during the time period; and
performing rate matching to encode and modulate the priority transmissions that are transmitted using resources proximate to the resources of the CSI-RSs.

22. The method of claim 21, further comprising:
transmitting a configuration message identifying the resources of the CSI-RSs that have proximate resources used for the priority transmissions.

23. The method of claim 18, further comprising:
preempting resources for greater than a defined number of demodulation reference signals (DMRSs) during the time period, wherein the selected reference signal preemption response scheme comprises refraining from receiving hybrid automatic repeat/request (HARQ) feedback information for the time period.

24. The method of claim 18, further comprising:
preempting resources for less than a defined number of demodulation reference signals (DMRSs) during the time period, wherein the selected reference signal preemption response scheme comprises receiving hybrid automatic repeat/request (HARQ) feedback information based on the DMRSs that are not preempted during the time period.

25. The method of claim 24, further comprising:
identifying one or more code block groups (CBGs) that are proximate to the resources of the DMRSs that are not preempted during the time period; and
encoding the one or more CBGs.

26. The method of claim 24, further comprising:
transmitting a configuration message identifying the CBGs.

27. An apparatus for wireless communication, comprising:
a processor;
memory in electronic communication with the processor; and
instructions stored in the memory and executable by the processor to cause the apparatus to:
identify a reference signal preemption scheme associated with one or more reference signal resources being preempted for priority transmissions during a time period;
determine that resources of one or more reference signals have been preempted during the time period and in accordance with the reference signal preemption scheme; and
implement a reference signal preemption response scheme that is selected based at least in part on the resources of the one or more reference signals being preempted.

28. The apparatus of claim 27, wherein the instructions are further executable by the processor to cause the apparatus to:
determine that resources for greater than a defined number of channel state information reference signals (CSI-RSs) have been preempted during the time period, wherein the selected reference signal preemption response scheme comprises avoiding performing channel measurement and reporting during the time period.

29. The apparatus of claim 27, wherein the instructions are further executable by the processor to cause the apparatus to:
determine that resources for greater than a defined number of channel state information reference signals (CSI-RSs) have been preempted for a first portion of a bandwidth part during the time period, wherein the selected reference signal preemption response scheme comprises performing channel measurement and reporting during the time period on a second portion of the bandwidth part that is different from the first portion.

30. The apparatus of claim 27, wherein the instructions are further executable by the processor to cause the apparatus to:
determine that resources for channel state information reference signals (CSI-RSs) have not been preempted during the time period; and
perform rate matching to decode and demodulate the priority transmissions that are transmitted using resources proximate to the resources of the CSI-RSs.

31. The apparatus of claim 30, wherein the instructions are further executable by the processor to cause the apparatus to:
receive a configuration message identifying the resources of the CSI-RSs that have proximate resources used for the priority transmissions.

32. The apparatus of claim 27, wherein the instructions are further executable by the processor to cause the apparatus to:
determine that resources for greater than a defined number of demodulation reference signals (DMRSs) have been preempted during the time period, wherein the selected reference signal preemption response scheme comprises refraining from performing decoding and demodulation of the transmissions occurring during the time period.

33. The apparatus of claim 32, wherein the instructions are further executable by the processor to cause the apparatus to:
refrain from transmitting hybrid automatic repeat/request (HARD) feedback information for the time period.

34. The apparatus of claim 27, wherein the instructions are further executable by the processor to cause the apparatus to:
determine that resources for less than a defined number of demodulation reference signals (DMRSs) have been preempted during the time period, wherein the selected reference signal preemption response scheme comprises performing channel decoding and demodulation during the time period for DMRSs that are not preempted during the time period.

35. The apparatus of claim 34, wherein the instructions are further executable by the processor to cause the apparatus to:
identify one or more code block groups (CBGs) that are proximate to the resources of the DMRSs that are not preempted during the time period; and
decode the one or more CBGs.

36. The apparatus of claim 34, wherein the instructions are further executable by the processor to cause the apparatus to:
receive a configuration message identifying the one or more CBGs.

37. The apparatus of claim 27, wherein the instructions are further executable by the processor to cause the apparatus to:
determine that resources for unicast demodulation reference signals (DMRSs) have been preempted during the time period, wherein the selected reference signal preemption response scheme comprises refraining from decoding and demodulating the transmissions occurring during the time period.

38. The apparatus of claim 27, wherein the instructions are further executable by the processor to cause the apparatus to:
determine that resources for tracking reference signals (TRSs) have been preempted during the time period, wherein the selected reference signal preemption response scheme comprises refraining from performing timing and frequency updating procedures for the channel during the time period.

39. The apparatus of claim 27, wherein the instructions are further executable by the processor to cause the apparatus to:
determine that resources for a defined number of tracking reference signals (TRSs) have been preempted during the time period, wherein the selected reference signal preemption response scheme comprises performing timing and frequency updating procedures during the time period using TRSs that are not preempted during the time period.

40. The apparatus of claim 27, wherein the instructions are further executable by the processor to cause the apparatus to:
determine that resources for phase tracking reference signals (PTRSs) have been preempted during the time period, wherein the selected reference signal preemption response scheme comprises refraining from performing phase tracking updating procedures during the time period.

41. The apparatus of claim 27, wherein the instructions are further executable by the processor to cause the apparatus to:

determine that resources for a defined number of phase tracking reference signals (PTRSs) have been preempted during the time period, wherein the selected reference signal preemption response scheme comprises performing phase tracking updating procedures during the time period using PTRSs that are not preempted during the time period.

42. The apparatus of claim 27, wherein the instructions to identify the reference signal preemption scheme are executable by the processor to cause the apparatus to:
receive a configuration message from a base station indicating the reference signal preemption scheme.

43. The apparatus of claim 27, wherein the apparatus is preconfigured with the reference signal preemption scheme.

44. An apparatus for wireless communication, comprising:
a processor;
memory in electronic communication with the processor; and
instructions stored in the memory and executable by the processor to cause the apparatus to:
transmit a configuration message indicating a reference signal preemption scheme associated with one or more reference signal resources being preempted for priority transmissions during a time period;
preempt resources of one or more reference signals during the time period and in accordance with the reference signal preemption scheme; and
implement a reference signal preemption response scheme that is selected based at least in part on the resources of the one or more reference signals being preempted.

45. The apparatus of claim 44, wherein the instructions are further executable by the processor to cause the apparatus to:
preempt resources for greater than a defined number of channel state information reference signals (CSI-RSs) during the time period; and
the selected reference signal preemption response scheme comprises refraining from receiving channel measurement and reporting during the time period.

46. The apparatus of claim 44, wherein the instructions are further executable by the processor to cause the apparatus to:
preempt resources for greater than a defined number of channel state information reference signals (CSI-RSs) for a first portion of a bandwidth part during the time period, wherein the selected reference signal preemption response scheme comprises receiving channel measurement and reporting during the time period on a second portion of the bandwidth part that is different from the first portion.

47. The apparatus of claim 44, wherein the instructions are further executable by the processor to cause the apparatus to:
refrain from preempting resources for channel state information reference signals (CSI-RSs) during the time period; and
perform rate matching to encode and modulate the priority transmissions that are transmitted using resources proximate to the resources of the CSI-RSs.

48. The apparatus of claim 47, wherein the instructions are further executable by the processor to cause the apparatus to:
transmit a configuration message identifying the resources of the CSI-RSs that have proximate resources used for the priority transmissions.

49. The apparatus of claim 44, wherein the instructions are further executable by the processor to cause the apparatus to:
preempt resources for greater than a defined number of demodulation reference signals (DMRSs) during the time period, wherein the selected reference signal preemption response scheme comprises refraining from receiving hybrid automatic repeat/request (HARD) feedback information for the time period.

50. The apparatus of claim 44, wherein the instructions are further executable by the processor to cause the apparatus to:
preempt resources for less than a defined number of demodulation reference signals (DMRSs) during the time period, wherein the selected reference signal preemption response scheme comprises receiving hybrid automatic repeat/request (HARD) feedback information based on the DMRSs that are not preempted during the time period.

51. The apparatus of claim 50, wherein the instructions are further executable by the processor to cause the apparatus to:
identify one or more code block groups (CBGs) that are proximate to the resources of the DMRSs that are not preempted during the time period; and
encode the one or more CBGs.

52. The apparatus of claim 50, wherein the instructions are further executable by the processor to cause the apparatus to:
transmit a configuration message identifying the CBGs.

* * * * *